United States Patent [19]
Oda

[11] Patent Number: 5,619,431
[45] Date of Patent: Apr. 8, 1997

[54] POSITION DETECTING DEVICE AND CORRESPONDING METHOD WITH COMPENSATION FOR THE EFFECTS OF OFFSET VOLTAGE AND/OR GAIN VARIATION

[75] Inventor: Yasuo Oda, Otone-machi, Japan

[73] Assignee: Wacom Co., Ltd., Japan

[21] Appl. No.: 398,782

[22] Filed: Mar. 6, 1995

[30] Foreign Application Priority Data

Mar. 18, 1994 [JP] Japan ................................. 6-073944

[51] Int. Cl.$^6$ ................................................ G01B 7/004
[52] U.S. Cl. .................................. 364/559; 364/560
[58] Field of Search .................................. 364/559, 560, 364/709.1, 709.11; 178/18–20; 324/207.24; 341/3, 15; 367/117, 127, 128, 907; 345/104, 173, 179; 375/317

[56] References Cited

U.S. PATENT DOCUMENTS

| | | | |
|---|---|---|---|
| 4,600,807 | 7/1986 | Kable | 178/19 |
| 4,709,209 | 11/1987 | Murakami et al. | 324/207 |
| 4,878,553 | 11/1989 | Yamanami et al. | 178/18 |
| 4,890,096 | 12/1989 | Taguchi et al. | 178/19 |
| 5,003,260 | 3/1991 | Auchterlonie | 324/207.24 |
| 5,109,225 | 4/1992 | Morita | 341/5 |
| 5,218,174 | 6/1993 | Gray et al. | 178/19 |
| 5,324,895 | 6/1994 | Inamori et al. | 178/18 |
| 5,374,787 | 12/1994 | Miller et al. | 178/18 |
| 5,453,684 | 9/1995 | Nakayama | 324/207.24 |

FOREIGN PATENT DOCUMENTS 3-147012  6/1991  Japan .

Primary Examiner—Emanuel T. Voeltz
Assistant Examiner—Hal D. Wachsman
Attorney, Agent, or Firm—Myers Liniak & Berenato

[57] ABSTRACT

A position detecting device for calculating coordinates of the position indicator rapidly and accurately to provide data related thereto without using any high sampling rate and high speed arithmetic operation is provided. The position detecting device performs a signal processing for providing coordinates of the pen based upon signals (50) from a sensing unit, which has a large number of loop coils disposed in parallel with respect to one another and generates said signals due to electromagnetic effects between the coils and a position indicator (input pen) (3) disposed on these coils. Said signal processing includes analog phase detect operations of multiplication and integration using the data of the signals, which include a first pair of phase detect signals orthogonally related to each other and a second pair of phase detect signals being in inverted relation with respect to each of the first pair of phase detect signals, to provide a plurality of values of real and imaginary parts which correspond to an objective frequency component of said signal. Following that processing, it further performs add and subtract operations on the data to eliminate errors due to the offsets and gain variations produced in the analog phase detect portion (70), and performs operations for calculating the amplitude and phase angle of the signal to determine the coordinates using the accurate data thus provided and simple approximate expressions of high accuracy.

22 Claims, 13 Drawing Sheets

Fig. 12
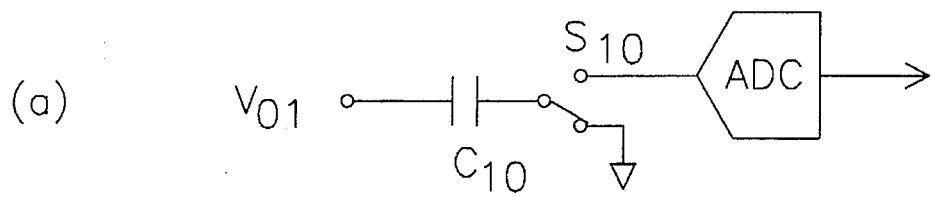
(a)
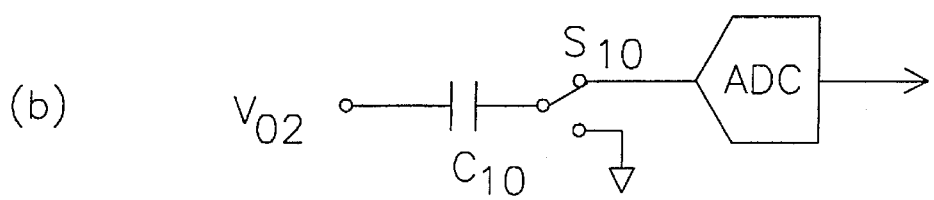
(b)
Fig. 13
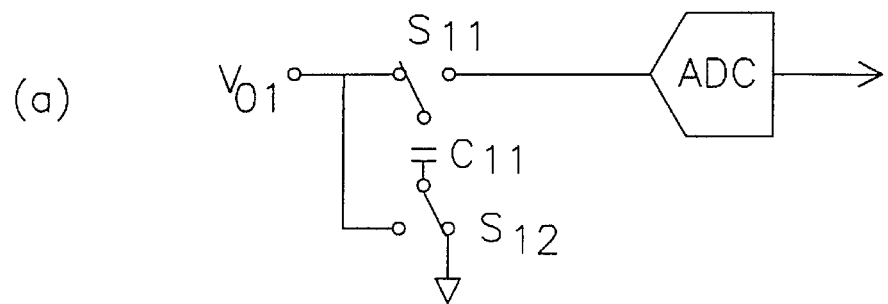
(a)
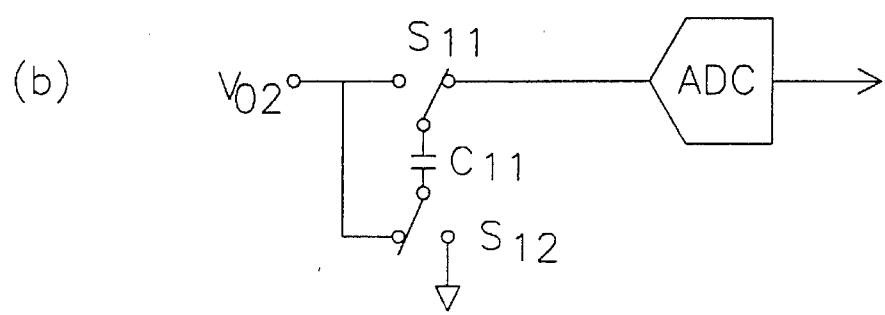
(b)

POSITION DETECTING DEVICE AND CORRESPONDING METHOD WITH COMPENSATION FOR THE EFFECTS OF OFFSET VOLTAGE AND/OR GAIN VARIATION

BACKGROUND OF THE INVENTION

1. Field of the Invention

The present invention relates to a position detecting device which calculates values including coordinate values of a position specified using a position indicator.

2. Description of Prior Art

In Japanese Patent Application Laying- open No. H3(1991)-147012 (hereinafter referred to as "the prior art"), the applicant has proposed means to reduce detecting time, expanding selectivity for measuring conditional, and compacting its size which was provided within a position detecting device for transmitting and receiving electromagnetic waves between a sensing unit and a position indicator to calculate coordinate values of a specified position indicated by a position indicator.

Firstly, describing briefly the prior art, the sensing unit comprising a large number of loop coils disposed in parallel with respect to each other in the direction of position detection is arranged to divide the loop coils into a plurality of groups, and one coil of each group is selected respectively, and an alternating current is applied to all coils selected at a time to generate electromagnetic waves resonating a turning circuit inside the position indicator. The electromagnetic wave transmitted by the turning circuit is then received by the selected loop coils to generate an induced voltage. Such a procedure is sequentially performed to each of the selected loop coils of the respective group to detect the induced voltage generated in the respective coil of the group i.e. an amplitude and phase angle of a received signal are thus detected to calculate the coordinate values of the specified position based on them.

One of the features of the prior art is that the selecting order of the loop coils of the groups is predetermined such that the respective pattern of the signal amplitude obtained therefrom is corresponding to a specific one of the loop coil located at the position indicator in order to determine the position of the position indicator.

Further, another feature of the prior art is that it uses the alternating signal, which has a frequency allowed to be suitably set, as a detecting signal and that signal generation and received signal processing means are provided with a digital signal processing capability to allow not only the use of a plurality of the position indicators but also miniaturizes their size.

To further detail the signal processing means of the prior art, the received signal is sampled with a predetermined cycle, and converted to a digital signal to which the discrete Fourier transform operation is performed to calculate the amplitude and phase angle of a suitable frequency component included in the received signal. According to this, it can provide accurately calculated phase angle and amplitude of each of the frequencies for a single loop coil, which enables a plurality of position indicators having different resonance frequencies to be used simultaneously and the required mounting area reduced when compared with the means up to that time using ceramic filters.

However, in order to ensure the reliable discrete Fourier transform, a predetermined number of samples of the signal will be required during said predetermined period ( receiving period ). That is, there is a difficulty to sample using a quite high sampling frequency (clock). For example, in the disclosed embodiment of the prior art, 16 sinusoidal waves of 500 kHz are received during 32 μsec of the receiving period to convert to 128 data of 6 bits. Thus a clock of 4 MHz is required to sample the signal for every 250 nsec. Practically a high speed analog to digital (A/D) converter is used. Both high speed and high resolution A/D converter, and a following arithmetic processing portion which conducts discrete Fourier transformation require a large circuit area and power dissipation in order to process such a high rate of data. Also, the high speed A/D converter has a relatively large number of many error factors, such as noise of its internal circuit as compared with a low speed A/D converter. Furthermore computer loads to control these processes are correspondingly increased so that an additional digital signal processor (DSP) is required to support the computer.

An alternative technique without using any high speed A/D converter can be used in which Fourier transform is performed on the receiving analog signal itself to obtain a signal having an amplitude and phase of a given frequency. The device for such technique is normally called a phase detector or synchronous detector, more specifically it has a capability to multiply the receiving signal with an alternating signal having a given frequency, and to integrate the resultant signals. Thereby an output value having corresponding amplitude and phase of the frequency component of the currently receiving signal can be obtained. The output will then be converted to digital data with which the coordinate values may be calculated.

However, as a common problem to analog phase detector, it may produce errors in its output signals due to the voltage offset, drifts, etc unique to the operational amplifier which is one of the components constituting the circuit, or gain variation between the components. When the amplitude and phase angles are calculated based on the values which include such errors, the following value such as coordinate value results to differ from the actual one, which in turn result in the accurate position not to be detected.

SUMMARY OF THE INVENTION

It is an objective of the present invention to provide a position indicator which can detect coordinates rapidly and accurately without using any high sampling rate and high speed arithmetic operation.

It is another object of the present invention to provide a position indicator which is allowed to set an applied alternating current signal to have a desired frequency, phase, and amplitude, and at the same time to use a plurality of position indicators without using any high sampling rate and high speed arithmetic operation.

Further, it is another object of the present invention to provide a position indicator which can reduce the required electric power dissipation and the cost thereof.

1) In order to accomplish the objects mentioned above, the present invention provides a position detecting device for calculating values including coordinate values of a specified position by a position indicator based upon electromagnetic effects between a sensing unit comprising a large number of loop coils disposed in parallel with respect to each other in the direction of position detection and a position indicator having at least one coil, wherein said position detecting device has: signal processing means for processing a receiving signal from said sensing unit; and coordinate calculating means for calculating the coordinates of said position indicator. Said signal processing means includes: a phase detect signal generator for generating a plurality of phase detect signals including first phase detect signals orthogonally related to each other and second phase detect signals, each of which is in an inverted phase relationship to each of the first signals; a switch for selecting one of said phase detect signals; an analog signal detect portion for performing multiplications and integrations of said plurality of phase detect signals with said receiving signal, and outputs a plurality of values of real or imaginary parts which correspond to one of the frequency components of said receiving signal; an analog to digital converter for converting said values of real or imaginary parts into digital signals; and a first arithmetic processor for performing predetermined add and/or subtract operations to said plurality of values of real or imaginary parts in order to eliminate offsets and/or gain variations included in said values: Said coordinate calculating means includes: a second arithmetic processor for calculating amplitudes and/or phase angles of any one of said frequency components within said receiving signal using the result of the first arithmetic processor.

2) The present invention further provides: a position detecting device for calculating values including coordinate values of a specified position by a position indicator based upon electromagnetic effects between a sensing unit comprising a large number of loop coils disposed in parallel with respect to each other in the direction of position detection and a position indicator having at least one coil, wherein said position detecting device has: signal processing means for processing a receiving signal from said sensing unit; and coordinate calculating means for calculating coordinates of said position indicator, said signal processing means include: a phase detect signal generator for generating a first pair of phase detect signals orthogonally related to each other, and a second pair of phase detect signal which are respectively in inverse relationship with each of the first pair; a switch for selecting one of said four phase detect signals; an analog signal detect portion for performing multiplication and integration by applying said four phase detect signals to said receiving signal and outputs two values of real and imaginary parts, respectively, which correspond to the component of any one frequency of said receiving signal; an analog to digital converter for converting said two values of the real part or two values of the imaginary part into digital signals; and a first arithmetic processor for performing predetermined subtract operations to said two values of the real part or the two values of the imaginary part in order to eliminate the value which corresponds to offset included in the values. Said coordinate calculating means are equipped with: a second arithmetic processor for calculating amplitudes and/or phase angles of any one of the frequency components within said receiving signal by using the result of said first arithmetic processor.

3) The present invention further provides: a position detecting device for calculating values including coordinate values of a specified position by a position indicator based upon electromagnetic effects between a sensing unit comprising a large number of loop coils disposed in parallel with respect to each other in the direction of position detection and a position indicator having at least one coil, wherein said position detecting device has: signal processing means for processing a receiving signal from said sensing unit; and coordinate calculating means for calculating the coordinates of said position indicator. Said signal processing means includes: a phase detect signal generator for generating two phase detect signals which are related orthogonally to each other; a switch selecting one of said two phase detect signals; an analog signal detect portion for performing multiplication and integration operations by applying said two phase detect signals to said receiving signal and outputs two values of real and imaginary parts, respectively, which correspond to any one of the frequency components of said receiving signal; an analog to digital converter for converting said two values of the real part or two values of the imaginary part into digital signals; and a first arithmetic processor for performing predetermined addition to said two values of the real part or two values of the imaginary part in order to eliminate the value which corresponds to offset included in the respective values. Said coordinate calculation mean includes: a second arithmetic processor for calculating the amplitudes and/or phase angles of any one of the frequency components within said receiving signal by using the result of the first arithmetic processor.

4) The present invention further provides a position detecting device as described in 1), wherein said plurality of phase detect signals in said signal processing means includes a first and second phase detect signal, which are different by 90° from each other and third and fourth phase detect signals which are different by 180°, respectively, from the first and second signals. Said analog signal detect portion comprises a first and second analog phase detector, each of which contains a multiplier and an integrator, respectively. Said plurality of values of real and imaginary parts respectively comprise: values of the real part which are outputs from the first and second detectors detecting the first and third signals, and values of the imaginary part derived from the first and second detectors processing the second and fourth signals. Said predetermined add and subtract operations processed within the first arithmetic processor include, adding the difference of the values of the real part of the first and third signal outputs by the first detector and the difference of the values of the real parts of first and third signal outputs by the second detector, adding the difference of the values of the real part of first signal output by the first and second detectors and the difference of the values of the real part of third signal outputs by the first and second detectors, then adding the results of the former two additions, and adding the difference of the values of the imaginary part of the second and fourth signal outputs by the first detector and the difference of said values of the imaginary part of the second and fourth signal outputs by the second detector, adding the difference of the value of the imaginary part of the second signal output by the first and second detectors and the difference of the values of the imaginary part of fourth signal outputs by the first and second detectors, then calculating the difference of the result of the former two additions. Said coordinate calculating means includes: a second arithmetic processor which calculates the amplitude and/or phase angles of any one of the frequency components within said receiving signal based upon the result of arithmetic calculation performed in said first arithmetic processor.

5) The present invention further provides a position detecting device as described in 2), wherein said four phase detect signals in said signal processing means are a first and second phase detect signals which are different by 90° from each other and third and fourth phase detect signals which are different by 180°, respectively, from the first and second signals. Said analog signal detect portion has first and second analog phase detectors in which each contains a multiplier and an integrator. Said two real and imaginary values respectively comprise: values of the real part which are outputs of the first detector detecting the first and third signals, and values of the imaginary part derived from the second detect or processing the second and fourth signals. Said predetermined subtract operations processed within said first arithmetic process or include: calculating the difference of the values of the real part of the first and third signal outputs by the first detector and calculating the difference of the values of the imaginary part of the second and fourth signal outputs by the first detector; and said coordinate calculating means includes: a second arithmetic processor for calculating the amplitude and/or phase angles of any one of the frequency components within said receiving signal based upon the result of arithmetic calculation performed in said first arithmetic processor.

6) The present invention further provides a position detecting device as described in 3), wherein said two phase detect signals in said signal processing means are first and second phase detect signals, 90° different from each other. Said analog signal detect portion consists of first and second analog signal d defectors, in which each contains a multiplier and an integrator. Said two values of real and imaginary parts respectively comprise: values of the real part derived from the first and second detectors detecting first signals; and values of the imaginary part derived from the first and second detectors processing second signals. Said predetermined addition processed within said first arithmetic processor include calculating the sum of the values of the real part of the first signals output by the first and second detectors and calculating the sum of the values of the imaginary part of the second signal outputs by the first and second detector. Said coordinate calculating means includes a second arithmetic processor which calculates the amplitude and/or phase angles of any one frequency component within said receiving signal based upon the result of arithmetic calculation performed in said first arithmetic processor.

7) The present invention further provides a position detecting device as described in any one of 4)–6), wherein said phase detect signals generated in said phase detect signal generator are polarity switching signals. Said multiplier utilized in said analog phase detectors include: means of generating polarity inverted and non-inverted signals from said receiving signal; and a switch controlled by said polarity switching signals for switching synchronously with the cycles of said signals. Said output signals from said multiplier, which include said inverted and non-inverted signals alternately switched by said switch, are equivalent to the signals obtained as the result of multiplication process of said receiving signal and a bipolar square wave.

8) The present invention further provides a position detecting device as described in 4)–6), wherein said phase detect signals generated in said phase detect signal generator are analog sinusoidal signals, and said multiplier utilized in said analog phase detector includes an analog multiplier for multiplying said receiving signal and said analog sign signals.

9) The present invention further provides a position detecting device as described in any one of 4)–6), wherein said phase detect signals generated in said phase detect signal generator are digital pseudo-sinusoidal signals, and said multiplier utilized in said analog phase detectors include a digital to analog converter and an analog calculator.

10) The present invention further provides a position detecting device as described in 4)–6), wherein: the phase detect signals generated in said phase detect signal generator are digital pseudo sinusoidal signals, and the multiplier utilized in the analog signal detect portion is realized by providing said digital pseudo- sinusoidal signals and said receiving signal as a reference signal into a multiplication digital to analog converter.

11) The present invention further provides a position detecting device for calculating values including coordinate values of a specified position by a position indicator based upon electromagnetic effects between a sensing unit where a large number of loop coils are disposed in parallel with respect to each other in the direction of position detection and a position indicator having at least one coil, wherein said position detecting device has: signal processing means for processing a receiving signal from said sensing unit; and coordinate calculating means for calculating coordinates of said position indicator. Said signal processing means includes: a phase detect signal generator for generating from said receiving signal, first detect signal which has the same phase as the receiving signal and second phase detect signals which has inverted phase with respect to said receiving signal; a switch for selecting either one of said first or second signal; an analog signal detect portion for performing analog multiplications and integrations by applying the receiving signal to said first and second signals to provide two values of the real part which correspond to the fundamental frequency component of said receiving signal; an analog to digital converter for converting said two values of real part into digital signals; and a first arithmetic processor for performing predetermined subtract operations to said two values in order to eliminate the value which corresponds to offset included in said two values. Said coordinate calculating means include: a second arithmetic processor for calculating the amplitudes of the fundamental frequency component of said receiving signal by using the result of the calculation performed in said first arithmetic processor.

12) The present invention further provides a position detecting device as described in 11), wherein said first and second phase detect signals are polarity switching signals generated by taking out from non-inverted and inverted outputs of a comparator to which said receiving signal is provided. Said multiplier utilized in said analog phase detectors include: means for generating inverted and non-inverted wave signals of said receiving signal, and a switch for alternating the selection thereof synchronously with the polarity inverting cycle of the polarity switching signals which include said first and second signals; and said output signals from the multiplier, which include said inverted and non-inverted signals alternately switched by said switch, which are respectively equivalent to signals obtained as the result of multiplication between said receiving signal and a bipolar square wave.

13) The present invention further provides a position detecting device as described in 11), wherein said first and second signals are generated by taking out from non-inverted and inverted outputs from an arithmetic processing amplifier to which said receiving signal is provided, and said multiplier utilized in said analog phase detectors includes an analog multiplier which multiplies said receiving signal with said first or second phase detect signals.

14) The present invention further provides a position detecting device as described in 2), wherein said analog phase detect portion includes an analog phase detector which has a first multiplier and an integrator, which sequentially apply one of said four phase detect signals to said receiving signal to provide said values of two real parts and two imaginary parts.

15) The present invention further provides a method for detecting position, wherein calculating values including coordinate values of a specified position by a position indicator based upon electromagnetic effects between a sensing unit comprising a large number of loop coils disposed in parallel with respect to each other in the direction of position detection and a position indicator having at least one coil, wherein said method of detecting position includes the following steps: calculating the coordinates of said position indicator by signal processing based upon a receiving signal received by said sensing unit. Said signal processing includes: generating a plurality of phase detect signals, including first phase detect signals which are orthogonally related to each other and second phase detect signals, each of which is respectively in an inverted phase relationship to each of the first signals; selecting one of said plurality of phase detect signals; performing analog multiplication and integration by applying said phase detect signals to said receiving signal and providing a plurality of values of real and imaginary parts, which correspond to any one frequency components of said receiving signal; converting said plurality of values into digital signals; performing predetermined add and/or subtract operations to said plurality of values in order to eliminate offsets and/or gain variations included in said values of said real and imaginary parts. Said calculating step of said coordinates includes: calculating the amplitudes and/or phase angles of any one frequency component of said receiving signal by using the result of above add and subtract operations.

16) The present invention further provides a method for detecting position as described in 15), wherein said method comprises a step of converting said plurality of values of real and imaginary parts into digital signals after performing the predetermined add and/or subtract operations.

17) The present invention further provides a method for detecting position, wherein calculating values including coordinate values of a position including the specified position by a position indicator based upon electromagnetic effects between a sensing unit where a large number of loop coils are disposed in parallel with respect to each other in the direction of position detection and a position indicator having at least one coil, wherein said method of detecting position comprises the following steps: calculating the coordinates of said position indicator by signal processing based upon a receiving signal transmitted from said sensing unit. Said signal processing includes; generating a first pair of phase detect signals which are orthogonally related to each other and a second pair each of which is in inverse relationship with respect to each of the first pair; switching said four signals; performing analog multiplication and integration by applying said four signals to said receiving signal; providing two values of real parts and two values of imaginary parts which correspond to any one frequency component of the receiving signal; converting said two respective values into digital signals; performing predetermined subtract operations to said two respective values in order to eliminate the value which corresponds to offset included in said two values of real parts and said two values of imaginary parts. Said calculating step of said coordinates includes: calculating the amplitudes and/or phase angles of any one frequency components of said receiving signal by using the result of above subtract operations.

18) The present invention further provides a method of detecting position as described in 17) wherein said method further comprises a step for converting said two respective values into digital signals after performing the predetermined subtract operations.

19) The present invention further provides a method for detecting position, wherein calculating values including coordinate values of a position including the specified position by a position indicator based upon electromagnetic effects between a sensing unit where a large number of loop coils are disposed in parallel with respect to each other in the direction of position detection and a position indicator having at least one coil, wherein said method of detecting position comprises the following steps: calculating the coordinates of said position indicator by signal processing based upon a receiving signal transmitted from said sensing unit. Said signal processing includes: generating two orthogonally related detect signals; switching said two signals; performing analog multiplication and integration by applying said two signals to said receiving signal; providing two respective values of real and imaginary parts which correspond to any one of frequency components of said receiving signal; converting said two respective values into digital signals; performing predetermined addition to said two respective values in order to eliminate the gains included in said two respective values. Said calculating step of said coordinates includes: calculating the amplitudes and/or phase angles of any one component of frequency within said receiving signal by using the result of above calculations processed in the first arithmetic processor.

20) The present invention further provides a method for detecting position as described in 19), wherein said method further comprises a step for conversion of said two respective values into digital signals after performing the predetermined addition.

21) The present invention further provides a method for detecting position, wherein calculating values including coordinate values of a position including the specified position by a position indicator based upon electromagnetic effects between a sensing unit where a large number of loop coils are disposed in parallel with respect to each other in the direction of position detection and a position indicator having at least one coil, wherein said method for detecting position includes the following steps: calculating the coordinates of said position indicator by processing signals based upon a receiving signal transmitted from said sensing unit. Said signal processing includes: producing a first phase detect signal which is in phase with said receiving signal and second phase detect signal which is in inverted phase from the receiving signal; switching said first and second signals; performing analog multiplications and integrations by applying said first and second signals to said receiving signal, and providing two values of the real part which correspond to the fundamental frequency component of said receiving signal; converting the two values into digital signals; performing predetermined subtract operations to said two values of said real parts in order to eliminate the value which corresponds to offset included in said two values. Said step for calculating said coordinates involves calculating the amplitudes and/or phase angles of any one frequency component of said receiving signal by using the result of above subtract operations.

22) The present invention further provides a method for detecting position as described in 21). Said method further comprises a step for converting said two values of said real parts into digital signals after performing the predetermined subtract operations.

23) The present invention further provides a method for detecting position as described in 15)–20) wherein the step for calculating said coordinate comprises, calculating the amplitude $L_c$ by applying an approximate equation $L_c = B + A/2$, and calculating said coordinates based upon a plurality of $L_c$ values transmitted from said plurality of loop coils adjoining each other, wherein for the absolute values of said values of real and imaginary parts, the larger value, the smaller value, and an amplitude to be calculated are designated A, B and $L_c$ respectively.

24) The present invention further provides a method for detecting position as described in 15)–20), wherein said step of calculating said coordinate comprises: calculating the phase angle θ by applying an approximate equation $$\theta = \{1.5A/(B+0.5A)\} \times K.$$

wherein, for the absolute values of said values of real and imaginary parts, A, B, and θ respectively designate the larger value, the smaller value and the phase angle to be calculated, and K is a value which expresses an angle equivalent to 45θ.

25) The present invention further provides a position detecting device as described in any one of 1)–10), wherein said coordinate calculating means calculate the amplitude $L_c$ by using an approximate expression $L_c = B + A/2$ (the greater of the absolute values of said values of real and imaginary parts is designated as B, the smaller as A), then calculating said coordinates based upon the $L_c$ values obtained from said plurality of loop coils adjoining each other.

26) The present invention further provides a method for detecting position as described in any one of 1)–10) or 14) wherein said coordinate calculating means calculate the phase angle θ using an approximate expression $$\theta = \{1.5A/(B+0.5A)\} \times K$$

(the greater of the absolute values of said values of real and imaginary parts is designated as B, the smaller as A, and K as a value which expresses an angle equivalent to 45θ).

The position detecting devices according to the present invention, values of real and imaginary parts can be obtained from an analog circuit by performing multiplications and integrations in the analog phase detector. A low speed A/D converter is available in digitizing these outputs.

According to the arrangement mentioned in 1), the analog phase detection of the receiving signal is performed by using first phase detect signals orthogonally related each other, and second phase detect signal which is in inverted phase relationship with each of the said first signals to produce respective values of real and imaginary parts. By performing predetermined subtractions and/or additions in the first arithmetic processor, the value which corresponds to offset unique to the circuit components and/or gain variations of the circuit components may be eliminated.

According to the arrangement mentioned in 2), analog phase detecting of the receiving signal is performed using the four detect signals and will produce the outputs of respective values of real and imaginary parts. By performing predetermined subtractions in the first arithmetic processor, the value which corresponds to offset unique to the circuit element will be compensated.

According to the arrangement mentioned in 3), the analog phase detection of the receiving signal is performed by using a pair of detect signals orthogonally related each other to produce the corresponding outputs with values of real and imaginary parts. By performing predetermined additions in said first arithmetic processor, gain variations of the circuit components may be eliminated.

According to the arrangement mentioned in 4), of the two detect signals, one has the phase which is in phase with the receiving signal and the other has the phase which is in an inverted phase relationship with the receiving signal. Analog phase detecting of the receiving signal is performed by using these detect signals, thereby providing corresponding values with the real part which represent the amplitude values of the receiving signal. By performing subtractions to the outputs, the value which corresponds to offset of the values of the real part may be eliminated.

According to the position detecting device of the present invention, the values of real and/or imaginary part obtained from the objective frequency component of the receiving signal have the values from which the errors are eliminated.

According to the method for calculating amplitude and phase angle, and its device, calculation for the amplitude and phase angle employ simple approximate expressions which generally include add operations so that high speed and accurate calculations may be attainable.

BRIEF DESCRIPTION OF THE DRAWINGS

FIG. 12 is a diagram showing an example means of subtracting the phase detector outputs in the present invention;

FIG. 13 is a diagram showing an example means of adding the phase detector outputs in the present invention;

DESCRIPTION OF THE PREFERRED EMBODIMENTS

Figure 1:
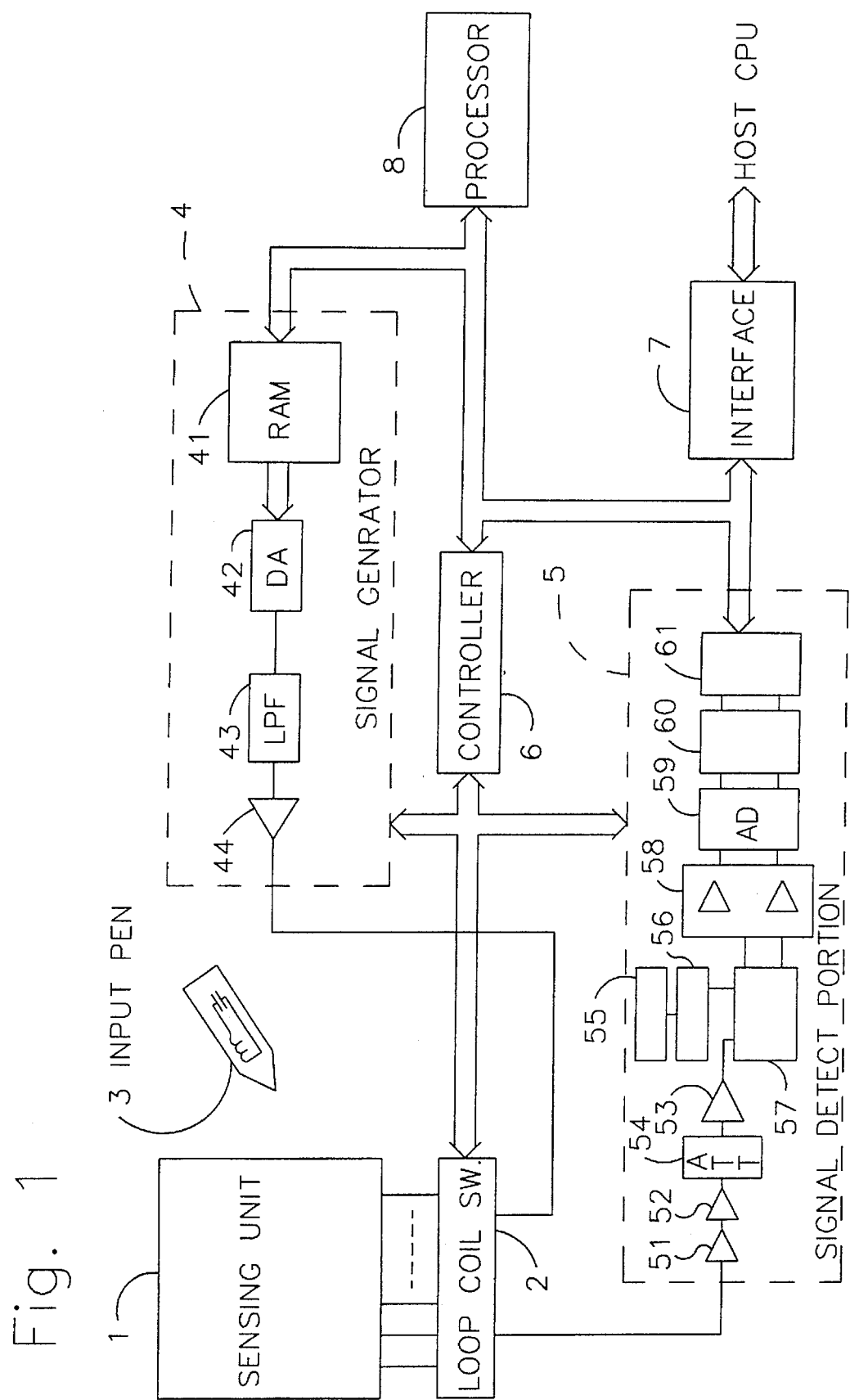
FIG. 1 is a schematic diagram showing a structure of an embodiment of a position detecting device according to the present invention.

FIG. 1 is a schematic diagram showing a general structure of an embodiment of a position detecting device according to the present invention. In FIG. 1, a numeral "1" designates a sensing unit, a numeral "2" designates a loop coil switch, a numeral "3" designates a position indicator, a numeral "4" designates a signal generator, a numeral "5" designates a signal detect portion, a numeral "6" designates a controller, a numeral "7" designates an interface portion, and finally a numeral 8 designates a processor.

The sensing unit 1 has a plurality of loop coils disposed in parallel with respect to each other (not shown), and is connected to select terminals (not shown) of the loop coil switch 2 such that a switching order of a plurality of coils in a plurality of groups is a predetermine one. By positioning the sensing units orthogonally to each other in respect to X and Y directions, a specified position is detected denoting the coordinates of two directions.

The loop coil switch 2 has a switch which connects the sensing unit 1 either to the signal generator 4 or to the signal detect portion 5. Switch 2 is a non- contact switch utilizing elements such as CMOSFETs or bipolar transistors. Hereinafter, the same is true for switches used on signal transmission lines.

Based on the commands issued by the processing unit 8, the controller controls switch timing for signal transmission and receiving between the loop coils of the sensing unit 1 and both of the signal generator 4 and the signal detect portion 5, and for the loop coils.

Figure 2:
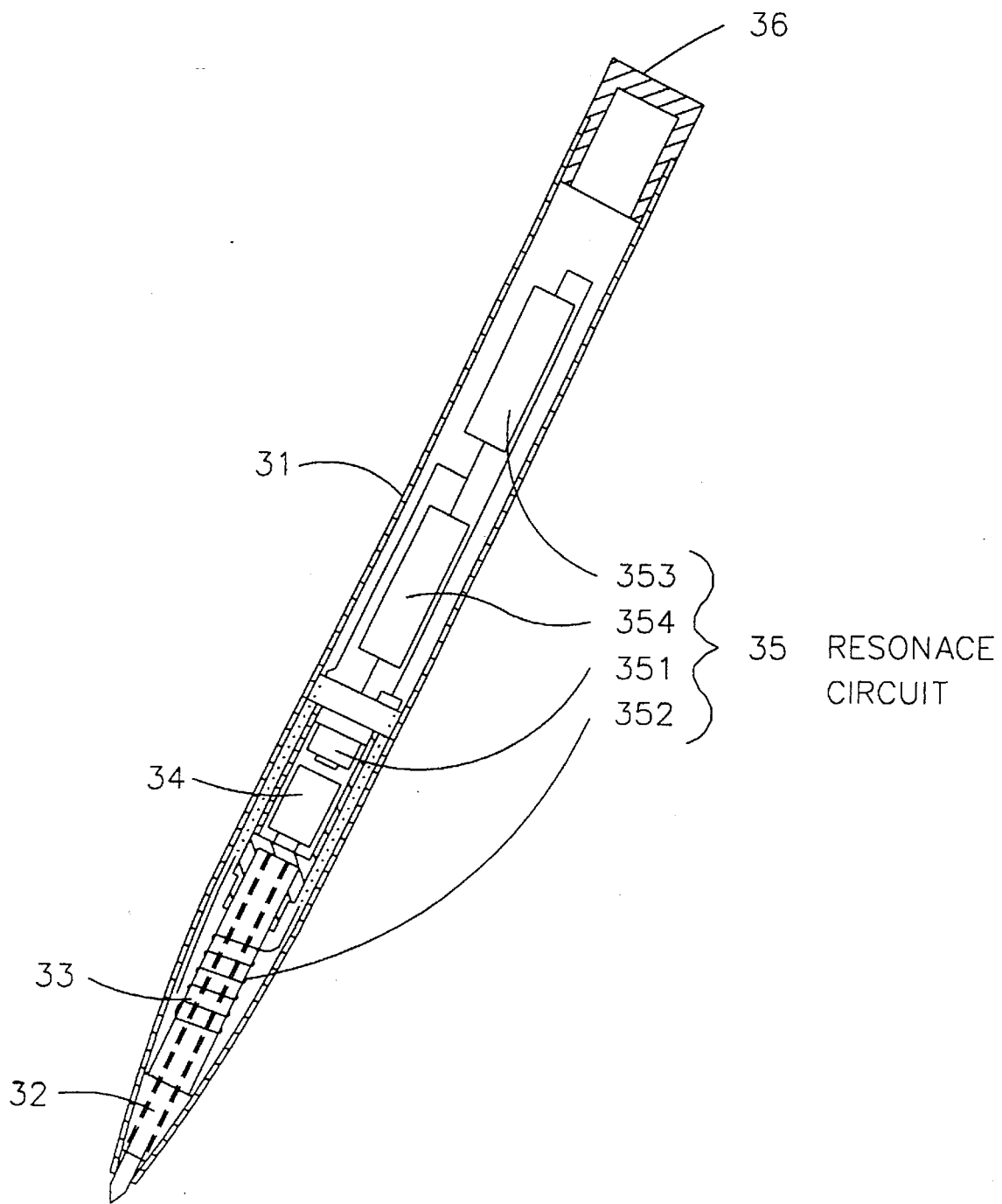
FIG. 2 is a cross sectional view of an input pen used in an embodiment of the present invention.

FIG. 2 is a sectional view of the position indicator (hereinafter referred to as the input pen) 3. The input pen 3, as shown in FIG. 2, has a casing 31 made of non-metal materials such as synthetic resin in which it includes, mentioning from the tip thereof, a core 32 such as of a ball point pen, a ferrite 33 having a through hole into which the core 32 is slidably received, a coil spring 34, and a tuning circuit 35 having a switch 351, capacitor 353 and 354 in a manner to integrally combine each other, and a cap 36 coaxially attached to the pen at the other end thereof.

The coil 352 and the capacitor 353 are connected in series with each other, forming a resonant circuit having a predetermined resonance frequency. The capacitor 354 lowers the resonance frequency when the switch 351 is set to "on". The switch 351 has an arrangement to be set to "on" when the input pen 3 is pushed against the sensing unit.

The signal generator 4, as shown on the FIG. 1, includes a random access memory (RAM) 41 in which suitable alternating signal data is stored, a digital to analog (DA) converter 42, and a low pass filter 43. The data stored in RAM 41 is D/A converted to provide analog pulse (PAM) signal. The PAM signal is provided through LPF 43 to generate an envelope signal which is then suitably amplified to provide an objective alternating signal.

It should be noted that the alternating signal or digital data stored in the analog RAM 41 may be used to generate a phase detector signal as will be described later in the signal detect portion 5.

Instead of the RAM 41, a read only memory (ROM) may also be used which stores data corresponding to the predetermined number of alternating signals. A bus buffer may also be used if a high speed CPU is employed as the processing unit 8.

Figure 3:
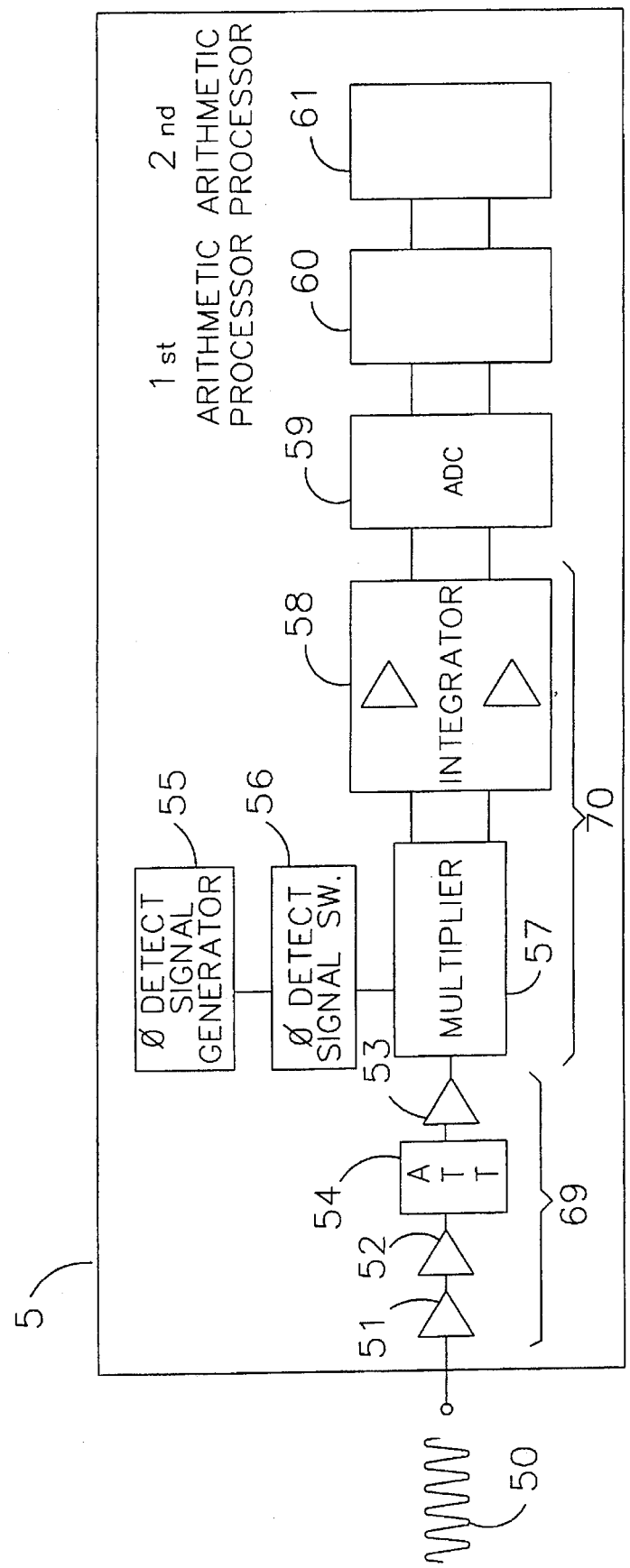
FIG. 3 is a diagram showing in detail the structure of the signal detecting unit of the position detecting device shown in FIG. 1.

FIG. 3 is a diagram showing a detailed structure of the signal detect portion 5. As shown in the FIG. 3, the signal detect portion 5 detects amplitude and phase angle of the objective frequency component of the receiving signal 50 received from the sensing unit 1, which comprises a preamplifier portion including a preamplifier 51, amplifier 52, an attenuator (ATT) 54, and an amplifier 53; detector signal generator 55; a signal detect switch 56; an analog phase detect unit 70 including a multiplier 57 and an integrator 58; an analog to digital (A/D) converter 59; a first arithmetic operation unit 60; and a second arithmetic operation unit 61.

The receiving signal 50 is amplified up to suitable level by the preamplifier 51, the amplifiers 52, an attenuator (ATT) 54 and the amplifier 53 in the preamplifier portion 69.

The detector signal generator 55 can generate an alternating signal or a digital signal having a suitable frequency, amplitude and phase. The signal detect switch 56 selects a signal from various detector signals generated by the detector signal generator 55. Since the function of the detector signal generator 55 is functionally the same as that of the signal generator 4, the function of the signal generator 4 may be applicable for it, or it may be integrated with the signal generator 4.

The multiplier 57 is an analog multiplier having a predetermined operational amplifier and a circuit component to operate multiplication of the output signal from the amplifier 53, i.e. the receiving signal with a phase detector signal.

The integrator 58 is an analog integrator having a predetermined operational amplifier and a circuit component to integrate the output of the multiplier 57.

The multiplier 57 and the integrator 58 perform Fourier transform operations, as will be described later, on the received or receiving signal 50 to output values included in the receiving signal, which correspond to real and imaginary parts of the same frequency component of the detector signal.

A/D converter 59 is a low speed A/D converter for converting the output signal from the analog phase detect portion 70 to digital data.

The output values from analog phase detect portion 70, which are digitized in the A/D converter 59, are used by the first arithmetic operation unit 60 for performing add and subtract operations, described later in more detail, to cancel the error component included in the output values due to offsets and gain variations which existed in the components of the preamplifier portion 69 and the analog phase detect portion 70.

The values of real and imaginary parts obtained from the first arithmetic operation unit 60 are used by the second arithmetic operation unit 61 for calculating the amplitude and phase of the objective frequency component of the receiving signal 50.

The analog phase detect unit 70, the first arithmetic operation unit 60 and the second arithmetic operation unit 61 will be described later in more detail referencing the preferred embodiments.

It should be noted that the several control operations, such as generation and switching of the phase detector signals, adjustments for of the multiplier 57 and the integrator 58, start and stop of conversion of the A/D converter 59 and calculation operations in the first and second arithmetic operation units 60 and 61, and the adjustment for the attenuator performed in the controller 6 are controlled by the signal detect portion 5.

The controller 6 operates based on the commands from the processing unit 8, and controls the operational timings of the portions in a predetermined sequence. It should be noted that for the purpose of reducing power consumption in the device, during receiving of the signal, it is held in the wait state to disable transmission to the sensing unit 1, and if the receiving signal 50 is not received i.e. the input signal from the pen 3 is not detected for more than a predetermined period of time, both the signal generator 4 and the signal detect portion 5 are temporarily set to wait state.

The interface 7 which exchanges data with a host computer, has at least two FIFO type registers which are directly connected to the bus line of said host computer. These registers are accessed to read date by the host computer.

The processing unit 8, which is operable to perform arithmetic operations such as calculation of coordinates of a specified position and to control data transmission with the host computer and the general control for several units of the device, has well-known micro processor and other elements required for data processing such as ROM and RAM.

Now, the general operation of the device of the present invention will be briefly explained. The processor 8 first sends a command to the signal generator 4, which is a continuation of 32 μsec of sinusoidal waveforms having a predetermined frequency, e.g. 500 kHz in this case, and then sends data for selecting one of the loop coils to the controller 6, which in turn performs the selection of the loop coils and the transmission and reception of the electromagnetic waves. Upon processing of the received signal 50 in the signal detect portion 5, resultant data of an amplitude and a phase angle are sent to the processing unit 8. The processing unit 8 determines the specified loop coil, on which the input pen 3 is locating, based on the pattern of received data, and calculates the coordinates of the position and phase information which are then transferred to the interface 7.

Figure 9:
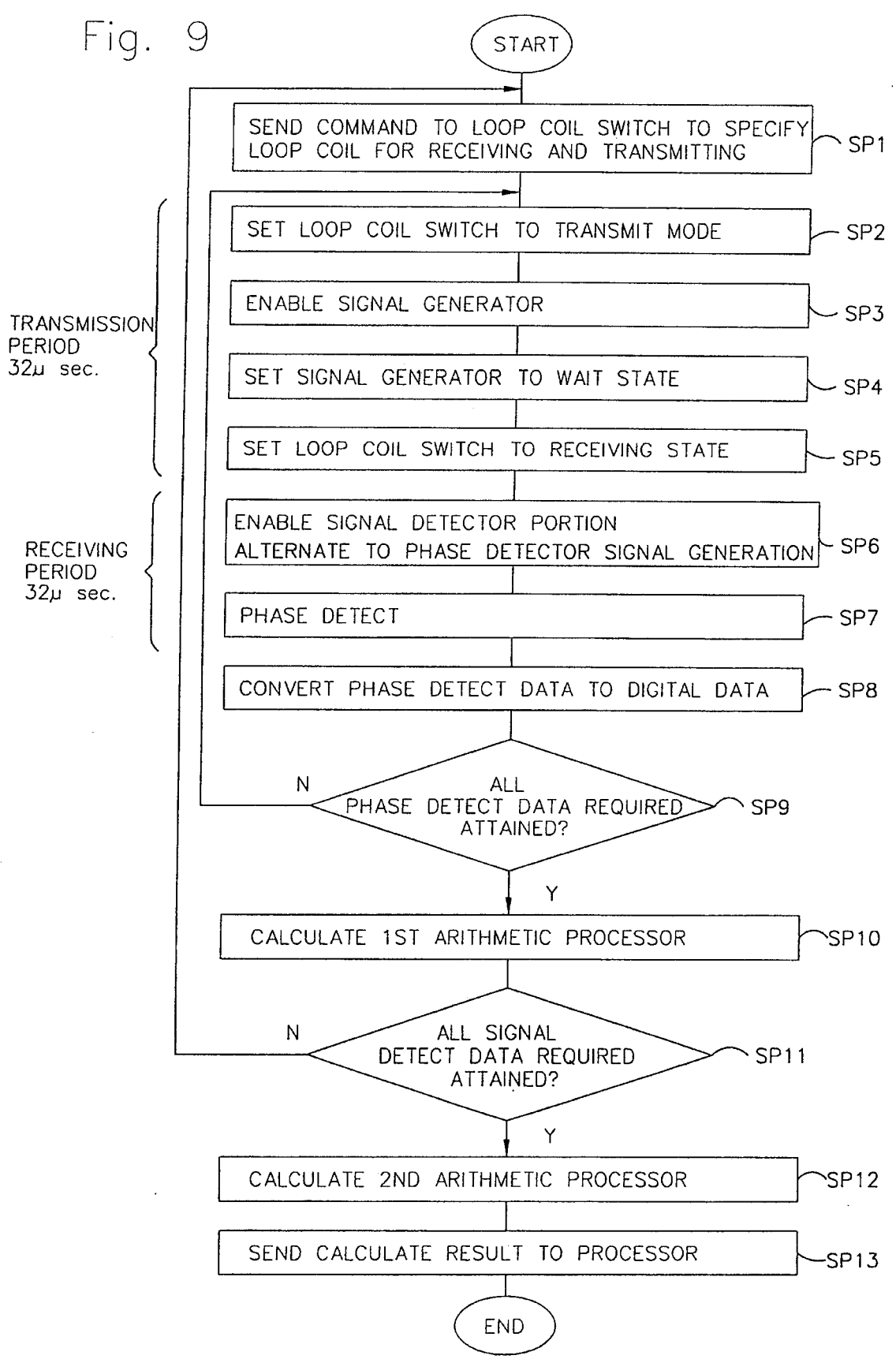
FIG. 9 is flow chart describing processes performed by the controller in FIG. 1.

FIG. 9 is a flow chart showing the processes performed in the controller 6 in regard to transmission and reception of one of the terminals of the loop coil switch 2 in the preferred embodiment on FIG. 1. Firstly, the loop coil switch 2 selects the terminal (SP1), and sets the loop coil switch 2 to send state (SP2). Then, it activates the signal generator 4 to generate a predetermined alternating signal, and sends the signal to the selected loop coil (SP3). Thereby, an electromagnetic interaction occurs between the loop coil and the resonance circuit. Next, the controller brings the signal generator 4 to wait state (SP4) and sets the loop coil switch 2 to receive state (SP5). The steps SP1–SP5 are performed during the transmission period of 32 μsec. Then, the controller activates the signal generator 4 to generate and switch the detector signals (SP6), and to perform phase detection (SPY). The steps SP6 and SP7 are performed during the receiving period of 32 μsec. The phase detection data is then digitized (SP8).

Next, the controller determines whether or not the required phase detecting data are attained. If not, the process is returned to SP2 and repeated (SP9). If all data required are attained, the process performs a predetermined add or subtract operation in the first arithmetic operation unit 60 such that the errors due to the circuit components are to be eliminated (SP10). Then, the process determines whether or not all the signal detecting data from all the selected loop coils are attained (SP11). If not, the process is returned back to SP1 to repeat the process for selecting a different loop coils. If all required data are attained, corresponding amplitude and phase of the frequency f0 component in the receiving signal is calculated in the second arithmetic operation unit 61 (SO), which is then sent in serial data to the processing unit 8 (SO). The details of the predetermined add and subtract operation will be described later.

In the actual operation, the iterative processing time may be shortened by generating next command signals for SP2 and SP3 during the A/D conversion at SP8.

The processing unit 8 determines a specific loop coil on which the input pen 3 is just positioned, based upon the signal level (amplitude) pattern to which the pen is corresponding one to one. Next, the switching sequence of the loop coil terminals is changed such that the pattern comes to have a single peak, and with that sequence thus attained, the transmission and reception operations are again repeated to confirm that the single peak pattern is attainable. If the single peak pattern is attained, the processor determines a specific loop coil on which the input pen 3 is just positioned and the operation is concluded. Then the process performs an interpolating calculation operation for locating the peak position of that pattern, and the resulting position is used to calculate the coordinates of the input pen 3, and data which is then transferred to the interface 7 with the data of the phase information.

Now, the received signal process performed in the analog phase detect unit 70 through the second arithmetic operation unit 61, comprising the feature of the present invention, will be described in detail below.

Firstly, the general structure and operation of the phase detector which comprises the analog phase detect unit 70 will be explained. Such a phase detector has a function to retrieve values of real and imaginary parts from a specific frequency component included in its input signal. Mathematically, it performs a Fourier transform on the input signal.

Figure 10:
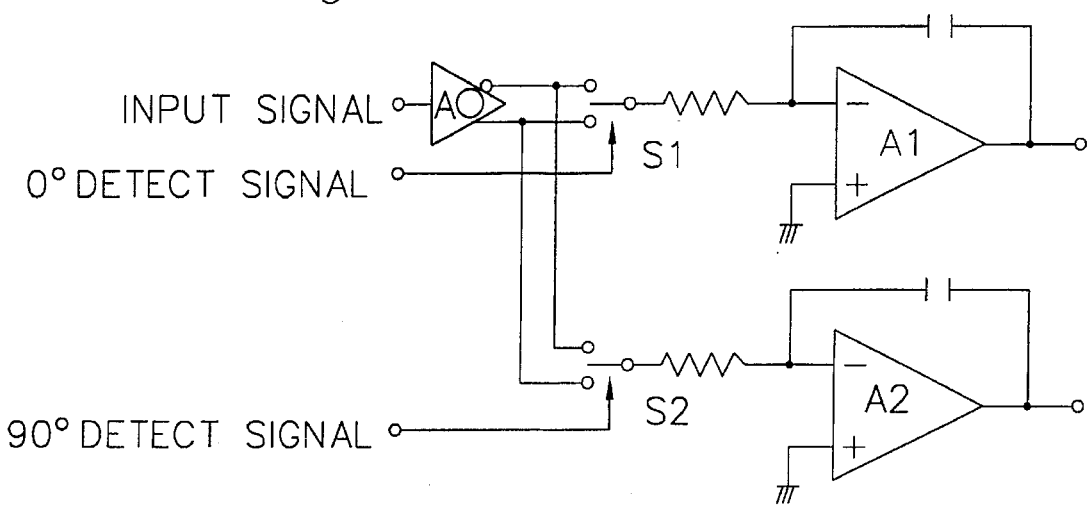
FIG. 10 is a diagram showing the circuit of the normal analog phase detector.
Figure 11:
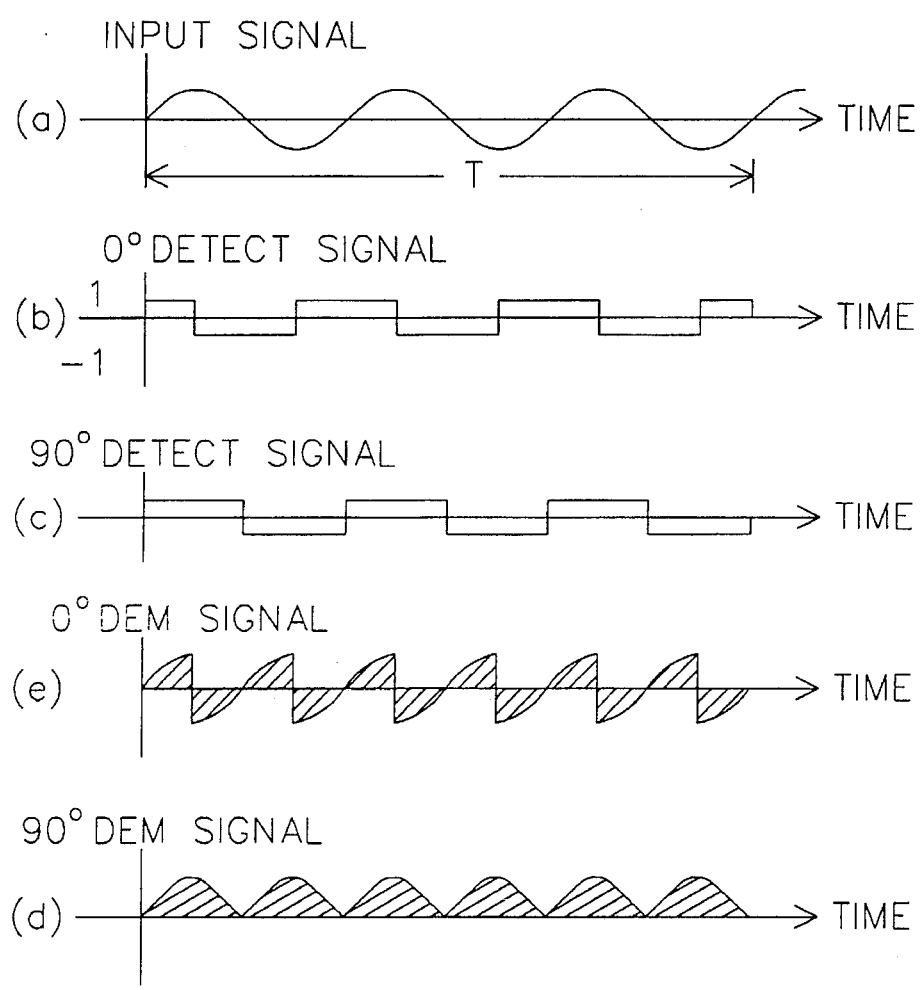
FIG. 11 is a diagram showing several signal wave forms of the analog phase detector shown in FIG. 10.

FIG. 10 is a diagram showing an exemplified structure of the normal phase detector. FIG. 11 shows signal waveforms at several points of the phase detector shown in FIG. 10.

An amplifier A0 is a calculation amplifier which has a function to provide two output signals respectively corresponding to inverted and non-inverted output signals of an input signal (i.e. receiving signal) (FIG. 11 (a)), and comprises several calculation amplifiers i.e. differential output type operational amplifiers, and electrical components such as resistance.

A zero phase (0°) detector signal is a signal for polarity switching as shown in the FIG. 11 (b), and has the same frequency components as those of the objective components included in the input signal.

A ninety phase (90°) detector signal is also a signal for polarity switching having the same frequency components as that of the 0° detector signal, as shown in FIG. 11 (c), except that it differs ninety degrees in phase from that of the 0° detector signal.

A switch S1 shown in FIG. 10, which is a switch controlled by the 0° detector signal and alternately switched in accordance with the polarity inversion thereof, has two input terminals connected respectively to inverted and non-inverted outputs from the amplifier A0. A 0° demodulator signal is attained as an input signal to the amplifier A0, as shown in FIG. 11(d), by the operation of the switch S1.

Similarly, a switch S2 shown on FIG. 10, which is a switch controlled by the 90° detector signal and alternately switched in accordance with the polarity inversion thereof, has two input terminals connected respectively to inverted and non-inverted outputs from the amplifier A0. A 90° demodulator signal is attained as an input signal to the amplifier A2, as shown in FIG. 11 (e), by the operation of the switch S2.

Operational amplifiers A1 and A2 shown in FIG. 10, each of which is an integrator having an integral constant determined by predetermined values of a resistor and a capacitor (hereinafter referred to as the integrator ), are equivalent to the integrator 58 shown in FIG. 3. The integrator A1 and A2 integrate 0° demodulation signal and 90° demodulation signals respectively during a predetermined period of time (reception period). When errors such as offset voltages and gain variations due to electrical components respectively comprising the operational amplifiers A0, A1 and A2 are neglected, the operational amplifier A1 outputs a value of the real part (Re) of the objective frequency component of the input signal, and the operational amplifier A2 outputs a value of the imaginary part (Im).

Modulation signals, which are obtained by switching operation of S1 and S2 for the inverted and non-inverted outputs from the input signals, are equivalent to the resultant signals of the products between the input signal, and 0° and 90° rectangular wave detector signals. In other words, the operation performed by the amplifier A0, the switches S1, and S2 are equivalent with that of a multiplier. Therefore, the phase detector including A0, A1 and A2 comprises a multiplier and an integrator. That is, it performs analog Fourier transform operation.

Now, briefly describing Fourier transform, it is one of well known techniques widely used for analyzing signal waveform. Fourier transform m or Fourier integration of a desired waveform (desired function) f(t) is expressed as follows.

$$F(\omega) = \int_{-\infty}^{\infty} f(t)e^{-j\omega t}dt \tag{1}$$

Also, inverted Fourier transform of a waveform is expressed as below.

$$f(t) = \frac{1}{2\pi} \int_{-\infty}^{\infty} F(\omega)e^{j\omega t}d\omega \tag{2}$$

As shown in Equation (2), f(t) is expressed with a sinusoidal wave component, ex p (−jωt), of frequency ω, adding spectral density F(ω) infinitely. Therefore, the spectral density F(ω) may can be identified as a component of the frequency ω included in f(t). F(ω) can be obtained by multiplying f(t) and ESP(−jωt), then integrating from negative infinity to positive infinity. Integration of finite time is actually performed. The F(ω) in Equation (1) is generally expressed as follows:

$$F(\omega)=Re(\omega)+jIm(\omega)=A(\omega)\cdot exp(j\Phi(\omega)) \tag{3}$$

m

As a value of the real part of complex number exp(jωt) is cos ωt and that of the imaginary part is sin the values of the real part Re(ω) and the imaginary part Im (ω) are expressed as follows:

$$Re(\omega) = A(\omega) \cos \phi(\omega) \tag{4}$$

$$Im(\omega) = A(\omega) \sin \phi(\omega) \tag{5}$$

And, $$A(\omega) = \sqrt{Re^2(\omega) + Im^2(\omega)} \tag{6}$$

$$\phi(\omega) = \tan^{-1}(Im(\omega)/Re(\omega))$$

A(ω) represents Fourier spectral o7f f(t), i.e. amplitude, and Φ(ω) represents the phase angle. Thus, after obtaining the values of the real part Re(ω) and the imaginary part Im(ω) of the component of the frequency ω in the receiving signal by performing Equation (1) which is Fourier transform to the actual receiving signal, the calculation of Equation (6) is performed, and amplitude and phase angle of the receiving signal are calculated.

In the position detecting device of the present invention, the amplitude information of the receiving signal is utilized to determine the loop coil on which the input pen is positioned, and the coordinates of the input pen are calculated based on that result. The phase angle information of the receiving signal is a difference of phase angle in the transmission and reception signals, and is used to determine the on/off state of the input pen.

In the above, exponential expression is used to simplify the explanation of Fourier transform. To be a harmonic component of Fourier transform, a function only has to basically be a pair of mathematical functions orthogonally related (i.e. satisfying the following relation).

$$\int f_i f_j dx = 0 (i \neq j) \tag{7}$$

In the embodiments from FIG. 4 to FIG. 6 described later and in a general example in FIG. 10, several square waves which have the same frequencies as the objective component of the frequency of the receiving signal are used as detector signals. These square waves include basic waves of the frequency, which are sine or cosine waves, and their harmonic component. The term of the harmonic component after Fourier transform will be zero, and only a term of fundamental wave component contributes to the values. In other words, any cosine wave (receiving signal) can be separated into cosine wave (real part) and sine wave (imaginary part) components, the fundamental wave of which has the same fundamental frequency with that of the square wave.

Although the problem in a common analog signal detect circuit as shown on FIG. 10 is that its output value results to introduce errors since in practice it can not ignore offset voltage and gain variation which existed in the operational amplifier, which is one of the components of the circuit.

Explaining firstly error caused by the offset voltage in a circuit shown on FIG. 10, in an ideal operational amplifier, when both non-inverted and inverted inputs have the same values, then the output voltage $V_o$ should have a zero value, but in practice it is common to have a non zero value. The difference existing between the input voltages of two input terminals at the output voltage $V_o=0$, is called input offset voltage. This offset voltage is amplified the same as the true input voltage resulting in error in the output voltage. Also, the offset voltage may be varied because of the environmental temperature change. This error is called drift error, which results an error in the output voltage as well.

For example, if the errors included in the output voltage due to the offset voltage of the amplifier A0 as shown on FIG. 10 are designated as $\epsilon_+$ for non-inverted output and $\epsilon_-$ for inverted output, the errors caused by the offset voltage in the output from the amplifier A0 are expressed as follows:

$$(\epsilon_-+\epsilon_+)/2 \tag{8}$$

If the objective frequency is 500 kHz, then sixteen waves may be included during a reception period. Therefore, the switches S1 and S2 controlled by the detector signal of the same frequency alternate their switching positions thirty-two times, and $\epsilon_-$ and $\epsilon_+$ are introduced sixteen times respectively into the output signal. Equation (8) shows an average error in time base. This error in turn comes to be introduced as the input voltage error of the next stage integrator A1 and A2

When $V_{in}$ represents an input voltage of an integrator having an integral constant RC, then the an output voltage $V_o$ of the integrator is expressed as; $V_o=-V_{in}T/RC$ where T represents a reception period. In the following Equations (10)–(17), $R_1C_1=R_2C_2=RC$. When $V_i$ represents a true inverted input signal (excluding errors), and $\epsilon_i$ represent the input offset voltage, which is equivalent to the non-inverted input voltage of the integrator A1, then the actual input voltage $V_{i1}$ to the integrator A1 can be expressed as follows;

$$V_{i1}=V_i \leftrightarrows (\epsilon_-+\epsilon_+)/2-\epsilon_1 \qquad (9)$$

Therefore, the output voltage $V_{o1}$ of the integrator A1 is:

$$V_{o1}=(V_i+(\epsilon_-+\epsilon_+)/2-\epsilon_1)T/RC+\epsilon_1 \qquad (10)$$

In equation (10) the first term represent a value given by intergration, and the second term $\epsilon_1$ represent an offset of zero point due to offset voltage output. Equation (10) can be rewritten as:

$$V_{o1}=-V_iT/RC+(\epsilon_1-(\epsilon_-+\epsilon_+)/2)T/RC+\epsilon_1 \qquad (11)$$

Now, if the output voltage $V_{o1}$ is converted into digital data form by an A/D converter for the next stage arithmetic operation, an additional offset voltage of the A/D converter $\epsilon_{AD}$ is introduced into the output voltage thereof. Then $V_{o1}$ is;

$$V_{o1}=-V_iT/RC+(\epsilon_1-(\epsilon_-+\epsilon_+)/2)T/RC+\epsilon_1+\epsilon_{AD} \qquad (12)$$

Thus if Re represents the true output value of the real part of the integrator A1, and $O_1$ represents the total offset error of the output, then $V_{o1}$ is expressed:

$$V_{o1}=Re+O_i \qquad (13)$$

$$Re=-V_iT/RC \qquad (14)$$

$$O_1=(\epsilon_1-(\epsilon_-+\epsilon_+)/2)T/RC+\epsilon_1+\epsilon_{AD} \qquad (15)$$

As for the integrator A2, the offset voltage of the amplifier A0 is equally effected by it so that true input voltage $V_{i2}$ of the integrator A2 is expressed as follows;

$$V_{i1}=V_i'-(\epsilon_-+\epsilon_+)/2-\epsilon_2 \qquad (16)$$

where $V_i'$ expresses true inverted input voltage, and $\epsilon_2$ expresses an input offset voltage, which is equivalent to the positive-phase input signal of the integrator A2). then the output voltage $V_{o2}$ of the integrator A2 is expressed as:

$$V_{o2}=-(V_i'+(\epsilon_-+\epsilon_+)/2-\epsilon_2)T/RC+\epsilon_2 \qquad (17)$$

In Equation (16), the first term is obtained by integration, and second $\epsilon_2$ is a shift of zero point due to offset voltage output. Equation (16) can be rewritten as:

$$V_{o2}=-V_i'T/RC+(\epsilon_2-(\epsilon_-+\epsilon_+)/2)T/RC+\epsilon_2 \qquad (18)$$

Now, if the output voltage $V_{o2}$ is converted into digital data form by an A/D converter for the next stage arithmetic operation, an additional offset voltage of the A/D converter $\epsilon_{AD}$ is introduced into the output voltage thereof. Then $V_{o2}$ is:

$$V_{o2}=-V_i'T/RC+(\epsilon_2-(\epsilon_-+\epsilon_+)/2)T/RC+\epsilon_2+\epsilon_{AD} \qquad (19)$$

Thus, if Im represents the true output value of the imaginary part of the into operational amplifiers A2, and $O_2$ represents the total offset error of the output, then $V_{o2}$ can be expressed similarly as the equations for the integrator A1:

$$V_{o2}=IM+O_2 \qquad (20)$$

$$IM=-V_i'T/RC \qquad (21)$$

$$O_2=(\epsilon_2-(\epsilon_-+\epsilon_+)/2)T/RC+\epsilon_2+\epsilon_{AD} \qquad (22)$$

As described above, the outputs of the integrator A1 and A2 respectively have errors $O_1$ and $O_2$ due to the offset voltage thereof.

Next, the gain variation of the integrator A1 and A2 will be explained. Gains of the integrator A1 and A2 are expressed as $G_1=-1/R_1C_1$ and $G_2=-1/R_2C_2$ respectively whereby in order to perform said calculations accurately, the value of $G_1$ should be equally set $G_2$, e.g. $G_1=G_2$. However, it is difficult for a normal integrator to have exactly the same values for every resistance R and capacity C, so that it results in the constants being $R_1C_1 \neq R_2C_2$, which in turn causes the gains $G_1$ and $G_2$ to be unequal i.e. $G_1 \neq G_2$. If the offset voltage mentioned above is set to zero, i.e. $O_1=O_2=0$ in Equations (13) and (20), then the voltages $V_{o1}$ and $V_{o2}$ are:

$$V_{o1}=RE=G_1V_iT \qquad (23)$$

$$V_{o2}=Im=G_2V_iT \qquad (24)$$

Therefore, if $G_1 \neq G_2$, then accurate outputs of the real part Re and imaginary part Im cannot be obtained even though the offset voltage is eliminated.

Figure 4:
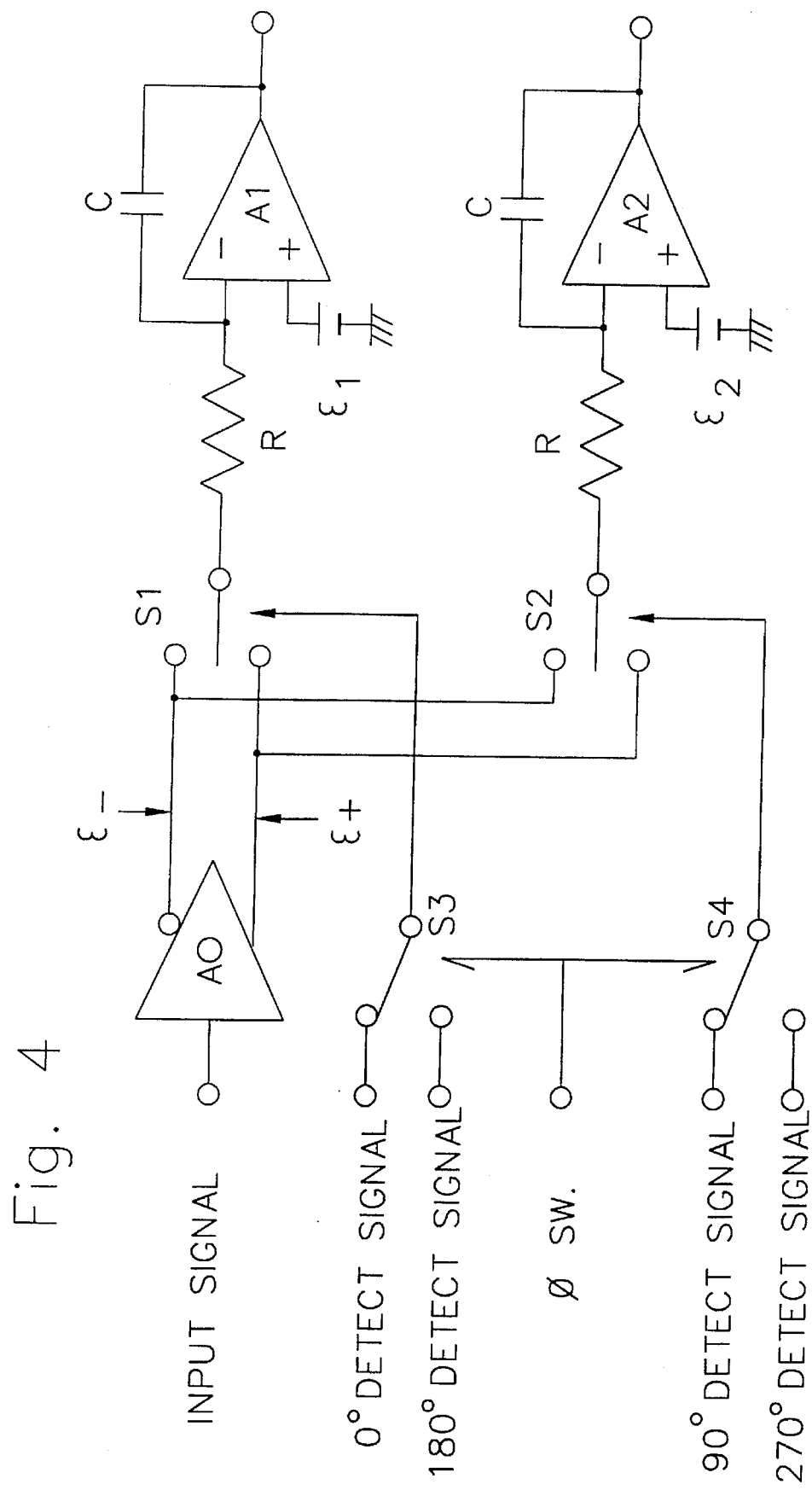
FIG. 4 is a diagram showing a circuit structure of an embodiment of an analog signal detect portion in the signal detect portion shown in FIG. 3.
Figure 7:
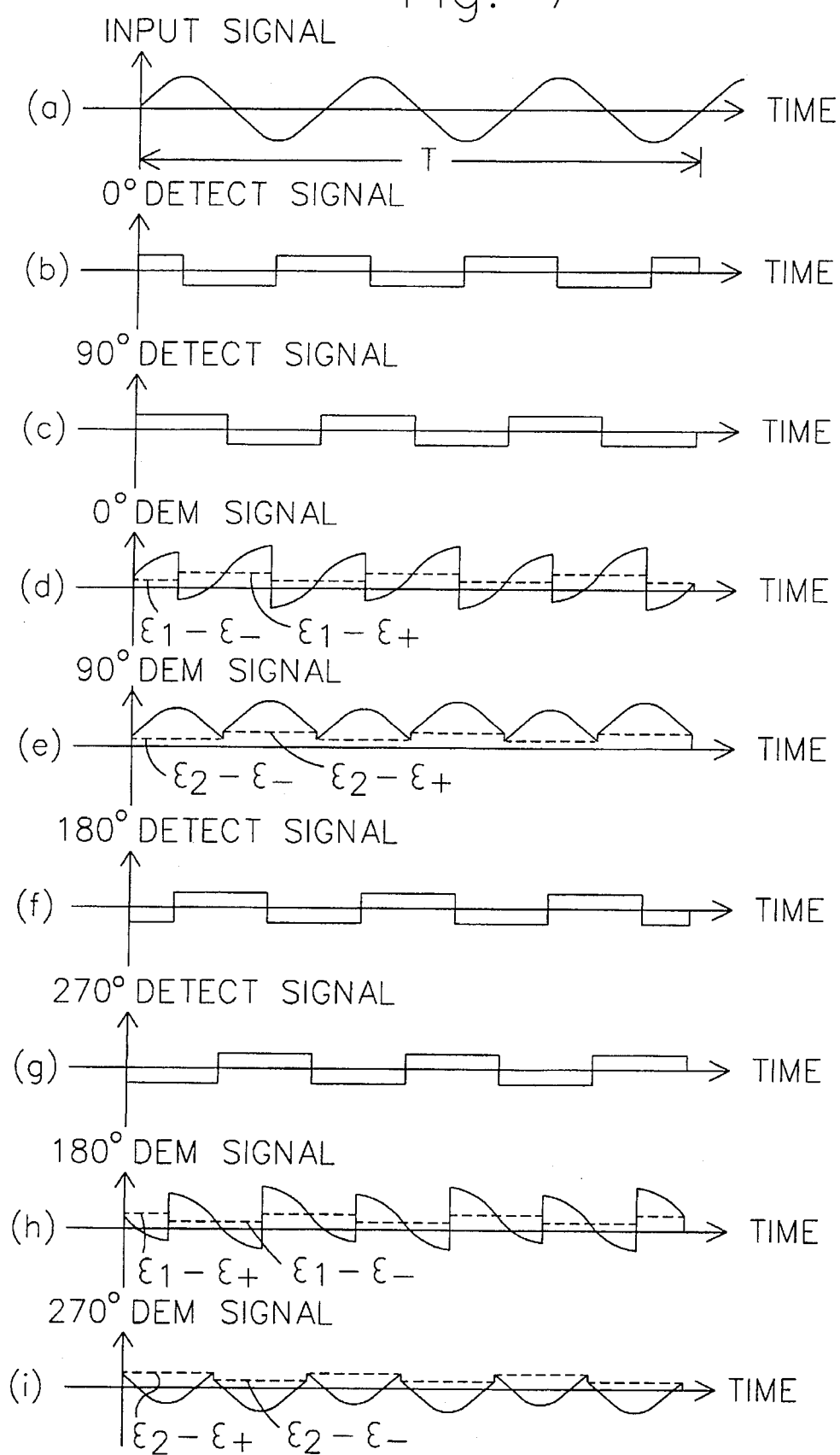
FIG. 7 is a diagram showing respective signal wave forms of the embodiment of the signal detect portion shown in FIG. 4.

FIG. 4 is a diagram showing one embodiment of a phase detector in accordance with the present invention (Embodiment 1) which is considered to compensate errors due to the offset voltage. FIG. 7 shows signal waveforms in several points of the circuit shown in FIG. 4. The same reference numbers are used for corresponding elements and waveforms in FIG. 4, 7 and 10. The multiplier portion of the phase detector shown in FIG. 4 is similar with that shown in FIG. 10 in regard to the operation for switching between non-inverted and inverted outputs of the amplifier A0 using the S1 and S2 in accordance with the cycle of polarity change of the detector signal. By applying 0° and 90° detector signals to the integrator A1 and A2, they provide similar outputs given by Equations (13) and (20).

In one embodiment, an arrangement for switching is further provided, which has additional 180° and 90° detector signals (FIG. (f) and (g)) differed in phase respectively with 180° and 90° from 0° detector signal, and the former is switched by a selector switch S3 and the latter is switched by a selector switch S4.

Referring now to FIG. 7, demodulation signals are provided by the switches S1 and S2 as shown in FIG. 7 (d) and (e) when the selector switches S3 and S4 are selecting 0° and 90° detector signals respectively. These signals are significantly similar with the respectively corresponding signals shown in FIG. 10, except that they have offsets as shown in FIG. 7. Demodulation signals are also provided by switches S1 and S2 as shown in FIG. 7 (h) and (i) when the selector switches S3 and S4 select 180° and 270° detector signals respectively.

Both 0° and 180° demodulation signals, which are provided to the integrator A1, have offset values of $\epsilon_1-\epsilon_+$ and $\epsilon_1-\epsilon_-$ respectively at the inverted and non-inverted outputs of the amplifier A0. It should then be noted that both 0° and 180° demodulation signals have the same amplitude and phase integrated to the offset component, but have inverted polarity of the same amplitude in regard to the true signal component. And both 90° and 270° demodulation signals, which are provided to the integrator A2 have offset values of $\epsilon_2-\epsilon_+$ and $\epsilon_2-\epsilon_-$ respectively at the inverted and non-inverted outputs of the amplifier A2. It should also be noted that 90° and 270° demodulation signals have the same amplitude and phase angles with regard to the offset component, but have inverted polarity of the same amplitude with regard to the true signal components.

Similarly to Equations (13) and (20), the outputs of the integrator A1 and A2 operating on these detector signals may be expressed as follows:

$$V_{o1}(0)=Re+O_1 \quad (25)$$

$$V_{o1}(180)=-Re+O_1 \quad (26)$$

$$V_{o2}(90)=Im+O_2 \quad (27)$$

$$V_{o2}(270)=-Im+O_2 \quad (28)$$

By performing subtract operations for Equations (25)–(28), i.e. between both sides of Equation (25) and Equation (26), and Equation (27) and Equation (28) respectively, true values of output signals of real and imaginary parts can be obtained as follows:

$$V_{o1}(0)-V_{o1}(180)=2Re \quad (29)$$

$$V_{o2}(90)-V_{o2}(270)=2Im \quad (30)$$

As shown in Equations (29) and (30), it is clear that the values corresponding to offset are eliminated from real and imaginary parts. These subtractions may be performed in the first arithmetic operation unit 60 using digital data following A/D conversion.

Since the A/D converters which comprise the following stage of the integrator A1 and A2 are only required to convert two sets of data, (e.g. 0° and 90°; 180° and 270° in the first embodiment), during one cycle of reception period (e.g. 32 μsec), low speed A/D converter is satisfactory applicable. In a conventional type of technique wherein the received signal is converted using a high speed A/D converter, it is required to convert a series of one hundred and twenty-eight data during the reception period, which is in turn required to provide a DSP which performs discrete Fourier transform on the converted data. By utilizing low speed A/D conversion, it is not necessary to provide DSP.

FIG. 12 is another embodiment showing means for subtraction. In this embodiment, means for subtraction is provided which comprises a capacitor $C_{10}$ and a switch $S_{10}$ in the proceeding stage of the A/D converter. Initially in a state of (a) in which the switch $S_{10}$ is connected to the GND side not to the A/D converter side, when $V_{o1}$ is applied to the capacitor $C_{10}$, then it begins to charge to a voltage $V_{o1}$. Then the switch $S_{10}$ is switched to the A/D converter side applying voltage $V_{o2}$, which results to provide a voltage of $V_{o2}-V_{o1}$. is performed on this voltage. Although this structure is very simple, $\epsilon_{AD}$ is not eliminated and an error remains.

Figure 5:
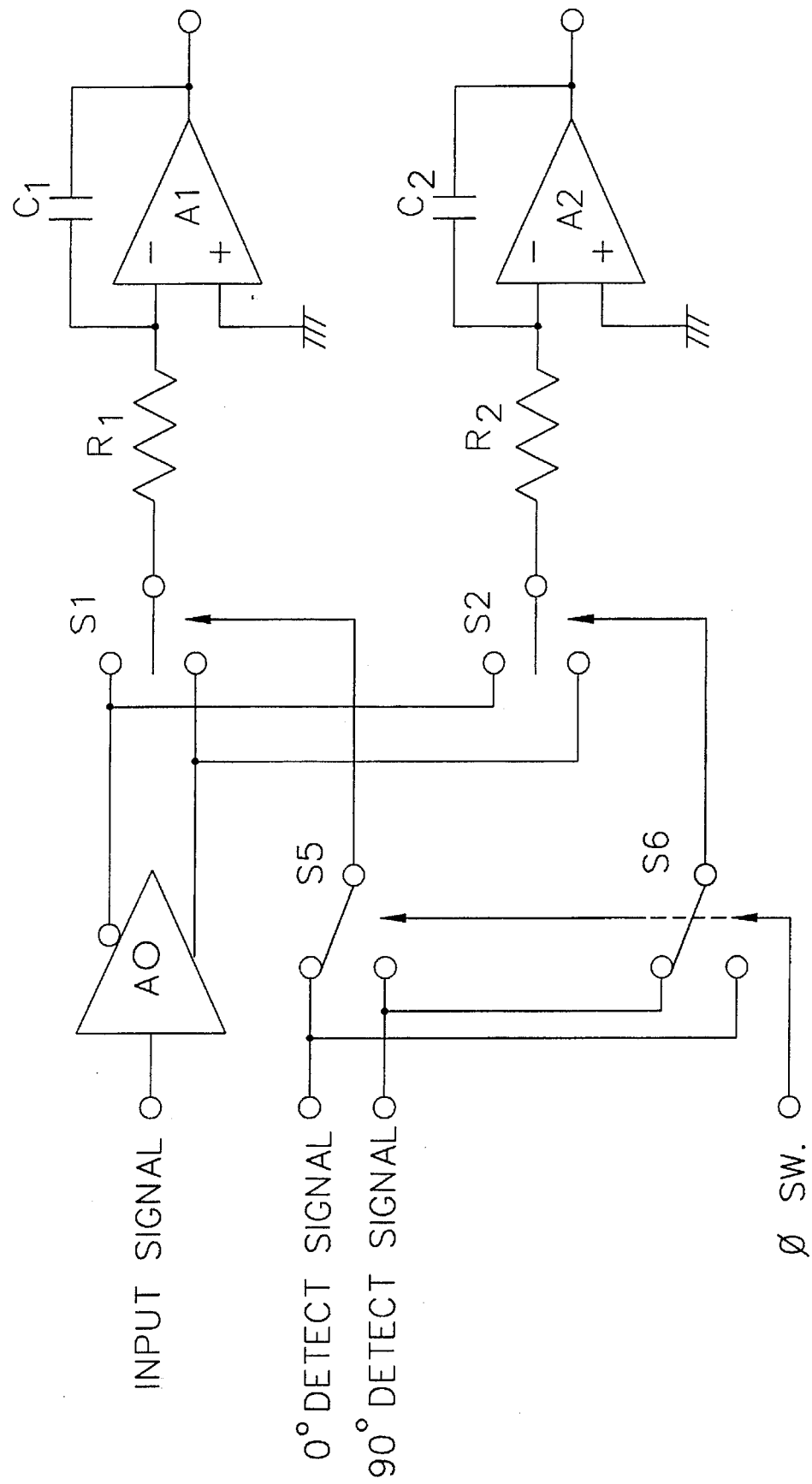
FIG. 5 is a diagram showing a circuit structure of another embodiment of an analog signal detect portion in the signal detect portion shown in FIG. 3.
Figure 8:
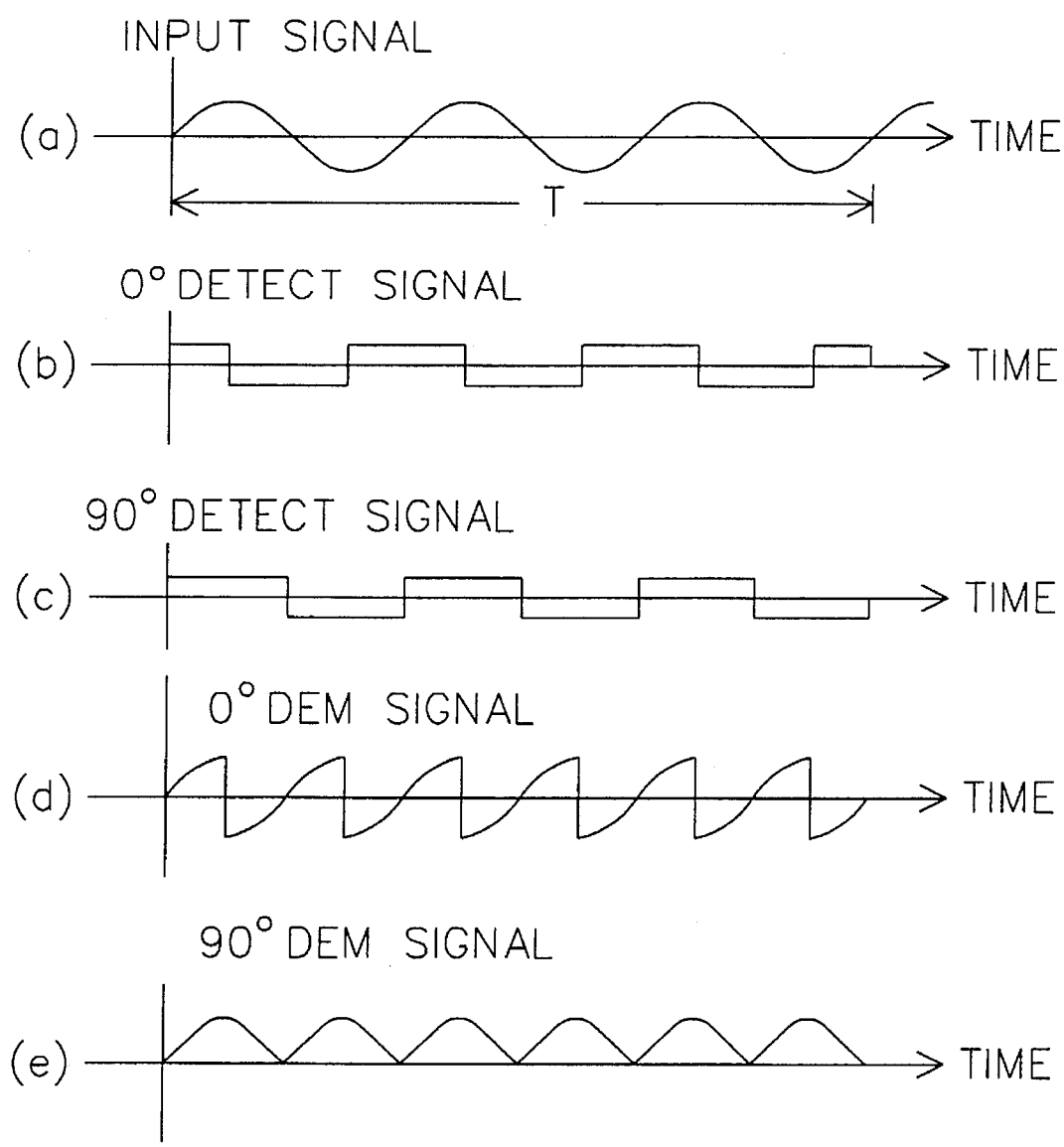
FIG. 8 is a diagram showing respective signal wave forms of the embodiment of the signal detect portion shown in FIG. 5.

FIG. 5 is a diagram showing another embodiment of a phase detector according to the present invention ( a second Embodiment ) wherein consideration is taken for eliminating errors due to the gain variation of the integrator. FIG. 8 shows waveforms at several points of the circuit shown in FIG. 5. In FIG. 5 and 8, the same reference numbers shown in FIG. 10 are used for corresponding elements and waveforms. The structure of multiplier portion of the phase detector shown in FIG. 5 is substantially the same as that of FIG. 10 with regard to the operation for switching between the non-inverted and inverted outputs of the amplifier A0 using the switches S1 and S2 based upon the polarity change cycle of the phase detector signal. The integrator A1 and A2 provide outputs which are substantially the same as those of Equations (13) and (20) with respect to the 0° and 90° detector signals.

The second embodiment may further be provided with selector switches S5 and S6 in order to apply respectively 0° and 90° detector signals to the integrator A2 and A1 detector.

Referring now to FIG. 7, if the selector switches S3 and S4 are selecting 0° and 90° detector signals respectively, then demodulation signals as shown in FIG. 8 (*d*) and (*e*) are provided through the switches S1 and S2. In the second embodiment, the offset errors are assumed to be ignored. Therefore, the waveforms shown in FIG. 8 (*d*) and (*e*) are substantially the same as the corresponding ones of FIG. 10. When the selector switches S5 and S6 select 90° and 0° detector signals respectively, a demodulator signal as shown on FIG. 8 (*e*) and (*d*) is provided through the switches S1 and S2 respectively.

Similar to as Equations (23) and (24), the outputs of the integrator A1 and A2 using these detector signals can be expressed as follows:

$$V_{o1}(0)=Re_1=G_1V_iT \quad (31)$$

$$V_{o2}=(0)=Re_2=G_2V_iT \quad (32)$$

$$V_{o1}=(90)=Im_1=G_1V_i'T \quad (33)$$

$$V_{o2}(90)=Im_2=G_2V_i'T \quad (34)$$

In Equations (31) and (34), 0° demodulator signal is designated as $V_i$, and 90° demodulator signal as $V_i'$ for simplifying the description.

True output signals of real and imaginary parts are provided by performing additions to the Equations from (31) to (34),i.e. by adding Equation (31) and (33) to Equation (32) and (34) respectively as follows:

$$V_{o1}(0)+V_{o2}(0)=Re_1+Re_2=(G_1+G_2)V_iT \quad (35)$$

$$V_{o1}(90)+V_{o2}(90)=Im_1+Im_2=(G_1+G_2)V_iT \quad (36)$$

As shown in Equations (35) and (36), it is clear that the gain variation of the integrator A1 and A2 are compensated both for real and imaginary parts. These additions can be performed such as in the first arithmetic operation unit 60, using digital data in the following stage of A/D conversion.

This A/D conversion can be done using a low speed A/D converter as mentioned in the first Embodiment.

FIG. 13 is another embodiment of means for addition. In this embodiment, means for addition is provided which comprises a capacitor $C_{11}$ and switches $S_{11}$ and $S_{12}$ in the proceeding stage of A/D conversion. Initially in a state (a) wherein the switch $S_{11}$ is connected to input side and the switch $S_{12}$ is connected to GND side as shown in the FIG. 12, if voltage $V_{o1}$ is applied to the input, then the capacitor $C_{11}$ is charged to the voltage $V_{o1}$. Then the switch $S_{11}$ and $S_{12}$ are respectively altered to the A/D converter side and the input side. When $V_{o2}$ is applied to the input, the voltage $V_{o2}+V_{o1}$ can be obtained. Digitization is performed on this voltage. Although this structure is very simple, $\epsilon_{AD}$ is not eliminated which results in an error remaining.

Figure 6:
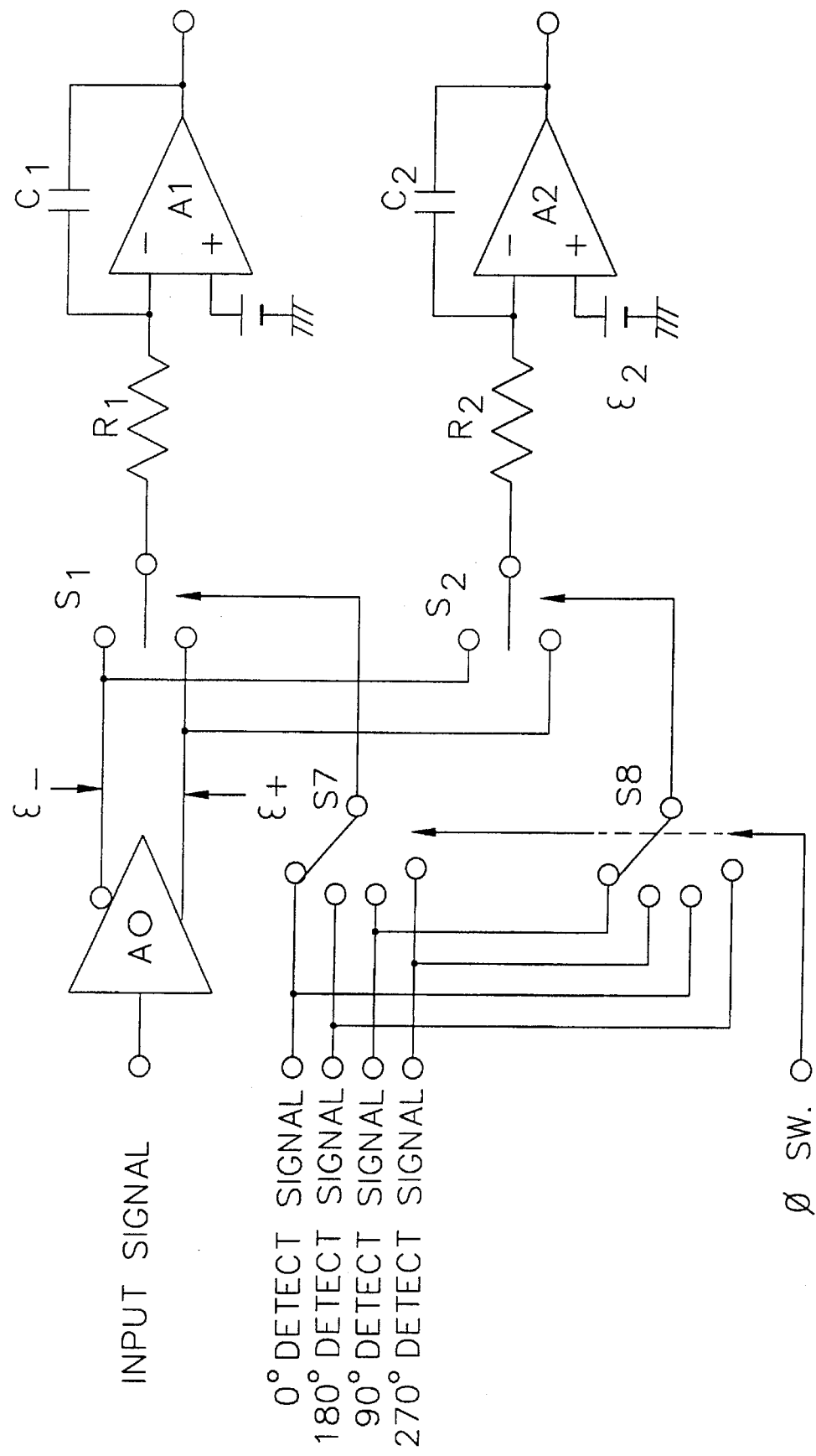
FIG. 6 is a diagram showing a circuit structure of another embodiment of an analog signal detect portion in the signal detect portion shown in FIG. 3.

FIG. 6 is a diagram showing another embodiment (a third embodiment) according to the present invention of a phase detector wherein consideration is taken for eliminating errors due to the gain variation of offset voltage and gain variations of the integrator. The structure of the multiplier portion of the phase detector shown in FIG. 6 is substantially the same as that mentioned above with regard to the operation for switching between the non-inverted and inverted outputs of the amplifier A0 using the switches S1 and S2 based upon the polarity change cycle of the phase detector signal.

The third embodiment has a structure which is integrated with the first and second embodiments. That is 0°, 90°, 180°, and 270° detector signals are selectively applied to the respective integrator A1 and A2 to provide corresponding outputs. The selector switches S7 and S8 are provided to connect the respective detector signals to the integrator A1 or A2.

Therefore, by suitably combining four detector signals and two integrators, eight possible data can be obtained as outputs from the phase detectors. Expressing this similarly to the first and second embodiments, these outputs can be expressed as follows.

$$V_{o1}(0) = Re_1 + O_1 = G_1 V_i T + O_1 \quad (37)$$

$$V_{o1}(180) = -Re_1 + O_1 = -G_1 V_i T + O_1 \quad (38)$$

$$V_{o1}(90) = Im_1 + O_1 = G_1 V_i T + O_1 \quad (39)$$

$$V_{o1}(270) = -Im_1 + O_1 = -G_1 V_i T + O_2 \quad (40)$$

$$V_{o2}(0) = Re_2 + O_2 = G_2 V_i T + O_2 \quad (41)$$

$$V_{o2}(180) = -Re_2 + O_2 = -G_2 V_{iT+o2} \quad (42)$$

$$V_{o2}(90) = Im_2 + O_2 = G_2 V_i T + O_2 \quad (43)$$

$$V_{o2}(270) = -Im_2 + O_2 = -G_2 V_i T + O_2 \quad (44)$$

Next, the errors are eliminated using Equations (37) to (44) by performing predetermined add and subtract operations.

Similar to the first embodiment, by performing subtract operations between Equations (38) and (37), (40) and (39), (42) and (41), and (44) and (43), the errors $O_1$ and $O_2$ due to the offset voltages are eliminated as follows:

$$2Re_1 = 2G_1 V_i T \quad (45)$$

$$2Im_1 = 2G_1 V_i T \quad (46)$$

$$2Re_2 = 2G_2 V_i T \quad (47)$$

$$2Im_2 = 2G_2 V_i T \quad (48)$$

Further, by performing add operations between Equations (45) and (47), and (46) and (48), the errors due to the gain variation of the integrator A1 and A2 are eliminated as in the second embodiment, and the true values of real and imaginary parts can be attained without including errors as follows.

$$2(Re_1 + Re_2) = 2(G_1 + G_2) V_i T \quad (49)$$

$$2(Im_1 + Im_2) = 2(G_1 + G_2) V_i T \quad (50)$$

Although the embodiments described eliminate the offset errors first by subtract operations and then gain errors by add operations, the operation order may be altered. Therefore, add operations may be performed first to eliminate the gain errors, and then subtract operations to eliminate offset errors.

The above add and subtract operations can be performed in the first arithmetic operation unit 60 using digital data in the next stage of A/D conversion. For this A/D conversion, a low speed A/D converter can be utilized as mentioned above.

Although the structure of the subtract means shown in FIG. 12 may be simplified by using the add means shown in FIG. 13, $\epsilon_{AD}$ still remain as errors.

As shown in the examples in FIGS. 12 and 13, the means of performing add and/or subtract operations simultaneously with A/D conversion may be used in combination with a phase detector which a structure differing from the Embodiments mentioned above.

In any of the Embodiments 1 to 3, the amplitude and phase angle of the reception signal are calculated by performing Equation (6) to the obtained values of the real part Re and the imaginary part Im. This operation is performed in the second arithmetic operation unit shown in FIG. 3, the results of which are transferred to the processing portion, where determination of a loop coil and the calculate operation of coordinates is performed.

In the first and third embodiments, square wave signals are used as detector signals, and multiplications are performed by using switching between the inverted and non-inverted outputs of the amplifiers. Square wave signals have a characteristic that they can be handled as digital signals, and therefore can be easily adapted to the signal processing system of the entire device. However, any signals may be used if their waveforms meet said orthogonal conditions. Also, any multiplication method may be used as long as it uses analog wave multiplier.

For example: the phase detector signal generator generates analog sinusoidal signals of 0°, 90°, 180°, and 270° phase, suitably selects respective signals, and provide them into the analog multiplier together with the reception signal. In this way, respective analog multiplication outputs can be obtained.

Another example is that respective detector signals are digital pseudo-sign signals generated from the phase detect signal generator, so that they may be multiplied with the reception signal in the analog multiplier after they are converted to analog sign signals by digital to analog conversion. With this method, the characteristic of the generated signal may be stored as digital data which can be changed easily as well. Therefore, as it becomes possible to switch detector signals by changing the digital data, the phase detect switch portion may also-be integrated into the digital processing portion.

As another example, if the respective detector signals generated from the phase detect signal generator are digital pseudo-sign signals, they are directly provided into a multiplicative D/A converter together with the reception signal as a reference input. Then analog conversion and multiplication of the detector signals also becomes possible in the multiplicative D/A converter. This method allows the generated signals not only to be stored and changed as digital data, but also the use of a general purpose multiplication D/A converter resulting in a reduction of cost.

Figure 14:
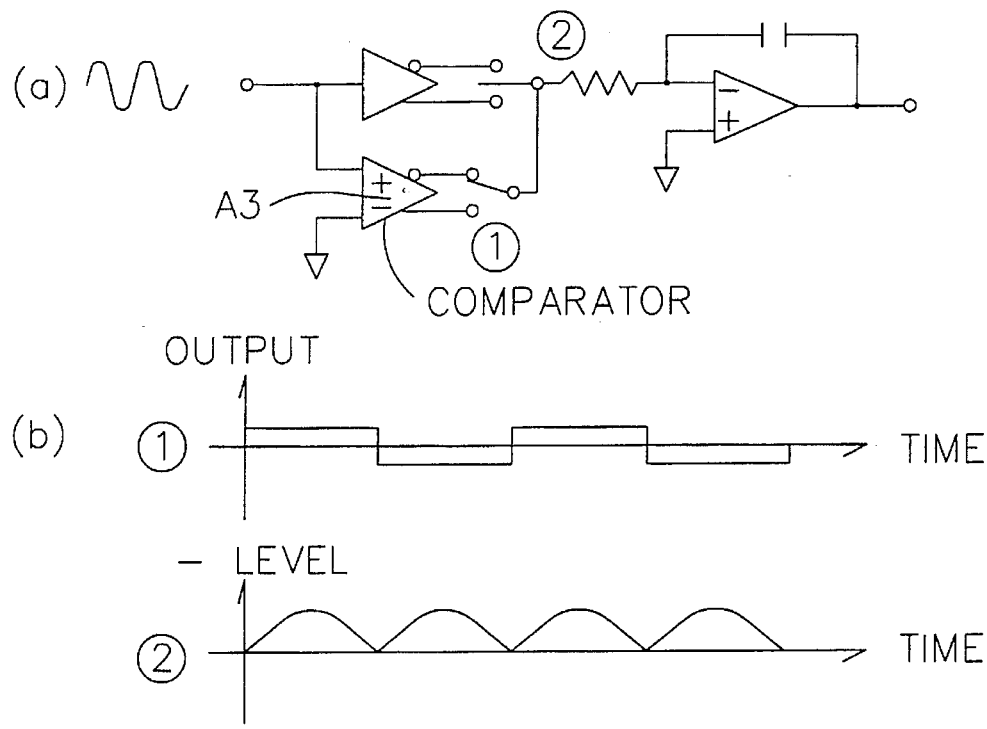
FIG. 14 is a diagram showing an example means of generating a phase detector signal in the present invention.
Figure 15:
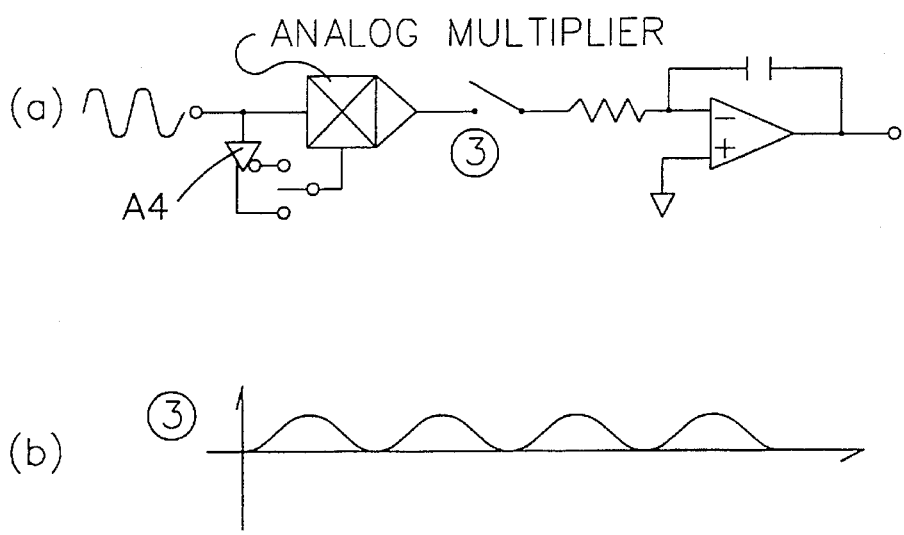
FIG. 15 is a diagram showing an example of means for generating phase detector signal in the present invention.

FIGS. 14 and 15 show examples of a phase detector when reproducing detect signals from the reception signal. As in FIG. 14 (a), if the reception signal is applied into a comparator A3 to produce non-inverted and inverted outputs, then an 0° square wave detector signal as shown on FIG. 14 (b) and an 180° detector signals (not shown) are respectively provided therefrom. The demodulator signal from the 0° detector signal is shown in FIG. 14 (c). The real parts may be obtained from the two detector signals, that can eliminate the offset errors by subtract operations. FIG. 15 (a) is an example of a structure using an analog multiplier wherein a non-inverted output (0° detector signal) and an inverted output (180° detector signal) of the reception signal are taken out (these outputs are not square waves) from an arithmetic processing amplifier A3, and are respectively applied to analog multipliers to be multiplied with the reception signal. FIG. 15 (b) shows the demodulator signal from 0° detector signal.

Means shown on FIGS. 14 and 15 are extremely simplified so that they are useful only in eliminating offset errors of values of the real part this can be attainable since the values of the real part are directly related to the amplitude of the reception signal.

Figure 16:
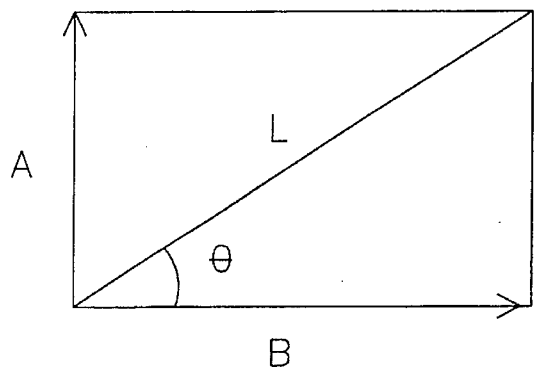
FIG. 16 is a diagram showing the relationships between values of real part and imaginary part respectively obtained from phase detectors, and amplitude and the phase angle in the present invention.
Figure 17:
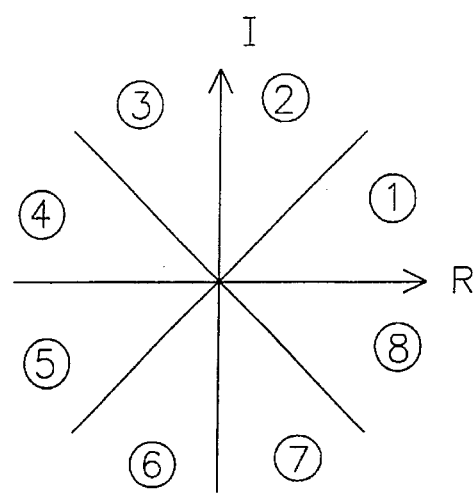
FIG. 17 is a diagram showing the method for dividing phase angles into eight sections in calculating a phase angle according to the present invention.
Figure 18:
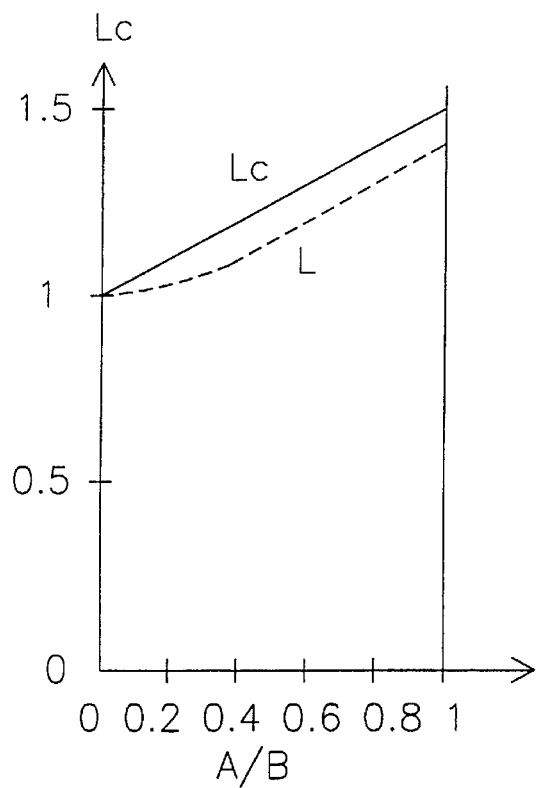
FIG. 18 is a diagram showing the relationship between a true value and an approximated value in calculating amplitude according to the present invention.

Referring now to FIGS. 16 to 18, description will be made on 20 an approach for calculating phase angle and amplitude using the values of real and imaginary parts obtained by the phase detectors. They are performed in the second arithmetic operation unit 61 in the example in FIG. 3. In calculating a phase angle $\Phi(\omega)$ in Equation (6), in general, an arc tangent table is provided from which the value corresponding to $Im(\bullet)/Re(\omega)$ is read to obtain the phase angle. The present invention however provides means for approximately calculating the value.

FIG. 16 is a diagram showing the relationship between the values of real and imaginary parts in a vector form. In FIG. 16, for the real part $Re(\omega)$ and the absolute value of the imaginary part $Im(\omega)$, the smaller one is defined as A, and the larger one is defined as B. Under the condition of $0 \leq A \leq B$, the phase angle $\theta_D$ may be obtained by the following approximate equations:

$$\theta_D = \{1.5A/(B+0.5A)\} \times 45 \text{ [degrees]} = \{1.5(A/B)/(1+0.5(A/B))\} \times 45 \quad (51)$$

The unit of Equation (51) is degrees. In the range of $0° \leq \theta \leq 45°$, the error due to the true value is in the range of $-0.1°$ – $+0.97°$. and Equation (51) is a simple incremental function of A/B, one value of $\theta_D$ may be determined.

Using radian as the unit, Equation (51) is expressed as follows:

$$\theta_R = \{1.5A/(B+0.5A)\} \times (\pi/4) \text{ [radian]} \quad (52)$$

Any unit may also be used which is convenient for a computer operation. For example, if 45° is expressed by a unit which uses a unit of 256, Equation (51) can be expressed as follows:

$$\theta_c = \{1.5A/(B+0.5A)\} \times 256 \quad (53)$$

Following is a list of operational procedure steps to perform the operation of Equation (53) using an operation function of a computer.

1) store A in Memory MA.

2) bit shift content of memory MA2 to attain A/2.

3) store B in memory MB.

4) add content of memory MA and memory MA2 and store result in memory MA.

5) add content of memory MB and memory MB2 and store result in memory MB.

6) multiply contents of memory MA with 256 by equivalent bit operation to generate the same result obtained, and divide by contents of Memory MB to attain $\theta_c$.

Although equation (51) may be applied so long as it exists in the range of $0° \leq \theta \leq 45°$, it is also applicable in calculating the respective phase angle based upon values of the real and imaginary part in each of sections if the range of phase angle is divided into eight sections as shown in FIG. 17. That is, the actual phase angle is attainable if the value $\theta_D$ is obtained from calculation of Equation (51), the angle of which is then reduced based upon a respective reference angle in each of sections. For example, in calculating the value for section 2, when $\theta_D$ value is obtained by applying Equation (51), the obtained $\theta_D$ is a relative angle starting from 90° toward the negative direction so that the actual phase angle $90° - \theta_D$ is attained.

A decision is made as that shown in which section FIG. 17 the phase angle is located using the sign and the absolute value of the real and imaginary parts obtained from the phase detector.

According to the above mentioned phase angle calculating means of the present invention, memory space for storing an arctangent table is nor required, and consequently time needed for referencing the table is eliminated. Also, the approximate expression having a high accuracy can be used for the present invention and the processing speed can be taken fast enough since the calculation procedures for denominations and denominators can be constructed only by bit shift and byte shift manipulations and add operations.

Moreover, as stated later, the result of B+0.5A described above in calculation procedures 5) can be immediately used as an approximate amplitude value.

As a general approach for performing calculation operations of Equation (6) with regard to the amplitude value, a square root operation table is prepared and the value is provided by referencing the table for the corresponding value:

$$\sqrt{Re^2(\omega) + Im^2(\omega)} \quad (54)$$

According to the present invention, an approximate means may also be used for this calculation. Said mean is similar to the mean used in calculating the phase angle described above.

Referring to FIG. 16 again, for the absolute value of the real part $Re(\omega)$ and the value of the imaginary part $If(\omega)$, the smaller one is defined as A, and the larger one is defined as B. If $0 \leq A \leq B$, the following approximate expression can be used to provide the amplitude:

$$L_c = B + A/2 \quad (55)$$

wherein $L_c$ is the amplitude to be obtained.

FIG. 18 is a diagram showing both curves respectively representing a true value L and the approximate value $L_c$ obtained by Equation (54) on the abscissa of A/B:

$$\sqrt{A^2 + B^2} \quad (56)$$

According to FIG. 18, a relative error of $L_c$ versus the true value L, that is $(L_c - L)/L_c$ is equal to or less than 11%. In regard to a plurality of amplitudes and phase angles measured from a plurality of loop coils adjoining each other as in the preferred embodiments, the relative errors included in respective $L_c$s obtained by calculation of Equation (55) are also approximately the same, if the respective phase angles $\theta$ is not substantially changed, in other words, if the value of A/B shown in FIG. 18 has approximately a certain value. Therefore, when calculating coordinates of the amplitude peak position with interpolation in its succeeding stage by using the above mentioned values, it does not result in any significant effect to them if the relative errors of amplitude values of respective points have approximately a certain value equal in each other. For example, the Japanese Patent Gazette No. H2 (1990)-53805 describes the following expression for calculating coordinate values by interpolation using values of three points:

$$xp = x2 + (\Delta x/2) \times \{(2V_{x2} - 4V_{x3} + V_{x4})/(V_{x2} - 2V_{x3} + V_{x4})\} \quad (57)$$

In Equation (57), Vs of the second term with subscripts 20 indicates amplitudes of respective point. It is clear that the aforesaid relative errors can be eliminated by a division of denomination/denominator even if the values include approximately the same level of errors, so that a satisfactory and accurate coordinates can be obtained from Equation (55).

According to the calculation procedure for Equation (55), it simply includes some bit shift and add operations, the required processing time is lessened, and a table for square root operation is not required.

Since no fixed sequence of the above-mentioned phase angle and amplitude calculating operations is defined, the amplitude calculate operation may be performed first. The calculation result of Equation (55) can be applied for the denominator for Equation (51) to calculate the phase angle since no fixed sequence of above mentioned phase angle and amplitude calculating operations is defined. Therefore, the required processing time is also lessened.

As stated above in the preferred embodiments according to the present invention, it is possible to eliminate errors due to offset voltage and/or gain variation of integrator in the signal processing circuit. The coordinates of the input pen can therefore be accurately calculated so that the position detecting device has greater reliability. The first and second embodiments described above can be applied to cases where any one of the errors is permissible, or a further simplified structure is desired.

The phase detectors used in the embodiments described above are capable of obtaining output signals of the real and the imaginary parts during a single reception cycle. Since four detecting data are required in the first and second embodiments described above, two cycles of measuring period are required. In the third embodiment described above, it requires eight detecting data so that four cycles of measuring period are required.

However, It is also possible to increase the quantity of data to be detected in one reception cycle by increasing the number of integrators so that the required measuring period can be lessened. It is also possible to collect phase detector data using a single phase detector in which 0°, 90°, 180°, 270° phase detector signals are measured by time sharing technique. There is of course no need to consider the gain variation existing between integrator for this case. Therefore, the means for eliminating offset errors and gain variation according to the present invention should not be limited only to two integrators, but one or more than two integrators can also be utilized.

Also, the sequence for applying detector signals having a unique phase is not limited to the sequence indicated in the embodiments, but may be changed as long as required data are ready.

The present invention may utilize a plurality of input pens, each of which may respond to a uniquely assigned different frequency, that is, may detect the respective position by the respective detector signal having said frequency during a separate reception period i.e. the measuring period for respective frequency.

Compared to the prior art, which is able to analyze a plurality of frequency components in a single reception cycle, the present invention may take a longer time, but the circuit structure is more simplified since a higher speed A/D converter is not required and an ordinary analog components are utilized in the structure of the device. If a high speed A/D converter which generally consumes a large amount of electricity is not used, current requirement of the whole device can be lowered thereby reducing power consumption of the device. A low speed A/D converter with good offset properties can also be used for A/D conversion in its succeeding stage. Also, in digital operation, there is no need to perform Fourier transform as in the prior art. As only some add and subtract operations are performed, load for CPU is significantly reduced, and therefore, said DSP can be eliminated.

In addition, the present invention is not only available for a position detecting device in which loop coils in the sensing unit transmit a signal and receive a reception signal by electromagnetic effect with an input pen including the resonant circuit. For example, it can also be applied to a reception signal when it takes a form in which the reception signal originates from an input pen and is received by a sensing unit; i.e. the present invention can be applied to any device as long as it finds values including coordinates of a specific position based on electromagnetic effect between loop coils in the sensing unit and the input pen.

As stated above, according to the present invention a structure is provided for performing analog signal detection, which utilizes a combination of a plurality detector signals of different phase angles in a reception signal, performing redetermined add and subtract operations based upon the detection of a series of data to eliminate errors due to the offset and/or gain variation of the signal processing circuits, so that the true values of the real and imaginary parts of the objective component of frequency in the reception signal can be obtained, thus the reliability of position detection of the input pen is increased.

Furthermore, the required circuit space can be reduced which is advantageous in miniaturization of the device since a high speed A/D converter is not required and the analog phase detector can be implemented with ordinary analog elements.

Furthermore, no DSP is required since neither high speed A/D conversion nor discrete Fourier transform operation are performed. And low power consumption of the whole device can be designed since the electric current requirement is reduced.

In addition, memory space can be saved and the required time for operations can be shortened since highly accurate approximate expressions are used in calculating the amplitude and phase of the detected signals.

What I claim is:

1. A position detecting device for calculating coordinate values of a specified position of a position indicator based upon electromagnetic effects between a sensing unit comprising a large number of loop coils disposed in parallel with respect to one another in the direction of position detection and the position indicator having at least one coil, wherein said position detecting device comprises:

signal processing means for processing a receiving signal from said sensing unit; and coordinate calculating means for calculating the coordinates of said position indicator;

said signal processing means including:

a phase detect signal generator for generating a plurality of phase detect signals including first phase detect signals orthogonally related to each other, and second phase detect signals, each phase of which is respectively in an inverted phase relationship with each of said first signals;

(ii) a switch for selecting one of said plurality of phase detect signals;

(iii) an analog signal detect portion for performing multiplications and integrations of said plurality of phase detect signals with said receiving signal, and outputting a plurality of values of real or imaginary parts which correspond to one frequency component of said receiving signal;

(iv) an analog to digital converter for converting said values of real or imaginary parts into digital signals; and (v) a first arithmetic processor for performing predetermined add and/or subtract operations to said plurality of values of real or imaginary parts in order to eliminate offsets and/or gain variations included in said values;

said coordinate calculating means including:

a second arithmetic processor for calculating amplitudes and/or phase angles of any one of said frequency components within said receiving signal using the result of the first arithmetic processor; and wherein said plurality of phase detect signals in said signal processing means include first and second phase detect signals which are different by 90° from each other and third and fourth phase detect signals which are different by 180°, respectively, from the first and second signals;

said analog signal detect portion comprising first and second analog phase detectors, each of which contains a multiplier and an integrator;

said plurality of values of real and imaginary parts respectively comprising:

values of the real part which are outputs from the first and second detectors detecting the first and third signals; and values of the imaginary part derived from the first and second detectors processing the second and fourth signals; and said predetermined add and or subtract operations processed within the first arithmetic processor including:

a) adding the difference of the values of the real part of first and third signal outputs by the first detector and the difference of the values of the real parts of the first and third signal outputs by the second detector, adding the difference of the values of the real part of first signal output by the first and second detectors and the difference of the values of the real part of third signal outputs by the first and second detectors, then adding the results of the former two additions;

b) adding the difference of the values of the imaginary part of the second and fourth signal outputs by the first detector and the difference of said values of the imaginary part of the second and fourth signal outputs by the second detector; and c) adding the difference of the value of the imaginary part of second signal output by the first and second detectors and the difference of the values of the imaginary part of fourth signal outputs by the first and second detectors, then calculating the difference of the result of the former two additions.

2. A position detecting device as claimed in claim 1, wherein said phase detect signals generated in said phase detect signal generator are polarity switching signals;

said multiplier utilized in said analog phase detectors include:

means of generating polarity inverted and non-inverted signals from said receiving signal, and a switch controlled by said polarity switching signals for switching synchronously with the cycles of said signals; and, said output signals from said multiplier, which includes said inverted and non-inverted signals alternately switched by said switch, are equivalent to the signals obtained as the result of multiplication process of said receiving signal and a bipolar square wave.

3. A position detecting device as claimed in claim 1, wherein said phase detect signals generated in said phase detect signal generator are analog sinusoidal signals, and said multiplier utilized in said analog phase detector includes an analog multiplier for multiplying said receiving signal and said analog sinusoidal signals.

4. A position detecting device as claimed in claim 1, wherein said phase detect signals generated in said phase detect signal generator are digital pseudo-sinusoidal signals, and said multiplier utilized in said analog phase detectors include a digital to analog converter and an analog calculator.

5. A position detecting device as claimed in claim 1, wherein: the phase detect signals generated in said phase detect signal generator are digital pseudo sinusoidal signals, and the multiplier utilized in the analog signal detect portion is realized by inputting said digital pseudo-sinusoidal signals and said receiving signal as a reference signal into a multiplication digital to analog converter.

6. A position detecting device as claimed in claim 1, wherein said coordinate calculating means calculate the amplitude $L_c$ by using an approximate expression $L_c=B+A/2$ (the greater of the absolute values of said values of real and imaginary parts is designated as B, the smaller as A), then calculating said coordinates based upon the $L_c$ values obtained from said plurality of loop coils adjoining each other.

7. A position detecting device as claimed in claim 1, wherein said coordinate calculating means calculate the phase angle θ using an approximate expression $$θ=(1.5A/(B+0.5A))×K$$

(the greater of the absolute values of said values of real and imaginary parts is designated as B, the smaller as A, and K as a value which expresses an angle equivalent to 45θ).

8. A position detecting device for calculating coordinate values of a specified position of a position indicator based upon electromagnetic effects between a sensing unit having a large number of loop coils disposed in parallel with respect to one another in the direction of position detection and a position indicator having at least one coil, wherein said position detecting device comprises:

signal processing means for processing a receiving signal from said sensing unit; and coordinate calculating means for calculating coordinates of said position indicator;

said signal processing means including:

(i) a phase detect signal generator for generating a first pair of phase detect signals orthogonally related to each other, and a second pair of phase detect signals, each of which is respectively in an inverse relationship with each of the first pair;

(ii) a switch for selecting one of said four phase detect signals in said first and second pairs;

(iii) an analog signal detect portion for performing multiplication and integration by applying said four phase detect signals to said receiving signal and outputting two values of real and imaginary parts respectively, which correspond to the component of any one frequency of said receiving signal;

(iv) an analog to digital converter for converting said two values of the real part or two values of the imaginary part into digital signals; and (v) a first arithmetic processor for performing predetermined subtract operations to said two values of the real part or the two values of the imaginary part in order to eliminate the value which corresponds to offset included in the values;

wherein said coordinate calculating means includes:
a second arithmetic processor for calculating amplitudes and/or phase angles of any one frequency component within said receiving signal by using the result of said first arithmetic processor;

wherein said four phase detect signals in said signal processing means include first and second phase detect signals which are different by 90° from each other and third and fourth phase detect signals which are different by 180°, respectively, from the first and second signals;

said analog signal detect portion including first and second analog phase detectors each of which contains a multiplier and an integrator;

said two real and imaginary values respectively comprising:
a) values of the real part which are outputs of the first detector, detecting the first and third signals, and
b) values of the imaginary part derived from the second detector processing the second and fourth signals; and said predetermined subtract operations processed within said first arithmetic processor including: means for calculating the difference of the values of the real part of the first and third signal outputs by the first detector and calculating the difference of the values of the imaginary part of the second and fourth signal outputs.

9. A position detecting device as claimed in claim 8, where said analog phase detect portion includes an analog phase detector which has a first multiplier and an integrator, which sequentially applies one of said four phase detect signals to said receiving signal to provide said values of two real parts and two imaginary parts.

10. A position detecting device for calculating coordinate values of a specified position of a position indicator based upon electromagnetic effects between a sensing unit comprising a large number of loop coils disposed in parallel with respect to one another in the direction of position detection and the position indicator having at least one coil, wherein said position detecting device comprises:

signal processing means for processing a receiving signal from said sensing unit; and coordinate calculating means for calculating the coordinates of said position indicator;

said signal processing means including:
(i) a phase detect signal generator for generating two phase detect signals which are orthogonally related to each other;
(ii) a switch selecting one of said two phase detect signals;
(iii) an analog signal detect portion for performing multiplication and integration operations by applying said two phase detect signals to said receiving signal and outputting two values of real and imaginary parts, respectively, which correspond to any one frequency component of said receiving signal;
(iv) an analog to digital converter for converting said two values of the real part or two values of the imaginary part into digital signals; and
(v) a first arithmetic processor for performing predetermined addition to said two values of the real part or two values of the imaginary part in order to eliminate the value which corresponds to offset included in the respective values;

said coordinate calculation means including:
a second arithmetic processor for calculating the amplitudes and/or phase angles of any one frequency component within said receiving signal by using the result of the first arithmetic processor;

wherein said two phase detect signals in said signal processing means include first and second phase detect signals 90° different from each other;

said analog signal detect portion includes first and second analog phase detectors each containing a multiplier and an integrator;

said two values of real and imaginary parts respectively comprising:
(i) values of the real part derived from the first and second detectors detecting first signals, and
(ii) values of the imaginary part derived from the first and second detectors processing second signals;

said predetermined addition processing within said first arithmetic processor including: calculating the sum of the values of the real part of first signals output by the first and second detectors; and b) calculating the sum of the values of the imaginary part of second signals output by the first and second detectors.

11. A position detecting device for calculating coordinate values of a specified position of a position indicator based upon electromagnetic effects between a sensing unit where a large number of loop coils are disposed in parallel with respect to each other in the direction of position detection, and the position indicator having at least one coil, wherein said position detecting device comprises:

signal processing means for processing a receiving signal from said sensing unit; and coordinate calculating means for calculating coordinates of said position indicator;

said signal processing means including:
(i) a phase detect signal generator for generating from said receiving signal, a first detect signal which has the same phase angle as the receiving signal and a second phase detect signal which has an inverse phase angle with respect to said receiving signal;
(ii) a switch for selecting one of said first and second phase detect signals;
(iii) an analog signal detect portion for performing analog multiplication and integration by applying the receiving signal to said first and second phase detect signals to provide two values of the real part which corresponds to the fundamental frequency component of said receiving signal;
(iv) an analog to digital converter for converting said two values of the real part into digital signals; and
(v) a first arithmetic processor for performing predetermined subtraction operations to said two values in order to eliminate the value which corresponds to offset included in said two values;

said coordinate calculating means including:
a second arithmetic processor for calculating the amplitudes of the fundamental frequency component of said receiving signal by using the result of the calculation performed in said first arithmetic processor;

wherein said first and second phase detect signals are polarity switching signals generated from non-inverted and inverted outputs of a comparator to which said receiving signal is provided;

said multiplication utilized in said analog phase detect portion including:

a) means for generating inverted and non-inverted wave signals of said receiving signal; and b) a switch for alternating the selection thereof synchronously with the polarity inverting cycle of the polarity switching signals which includes said first and second signals;

wherein said output signals from the multiplication, which include said inverted and non-inverted signals alternately switched by said switch, are respectively equivalent to signals obtained as the result of multiplication between said receiving signal and a bipolar square wave.

12. A method for detecting position and calculating coordinate values of a specified position of a position indicator based upon electromagnetic effects between a sensing unit comprising a large number of loop coils disposed in parallel with respect to one another in the direction of position detection and the position indicator having at least one coil, wherein said method of detecting position comprises the following steps:

calculating the coordinates of said position indicator by signal processing based upon a receiving signal received by said sensing unit;

said signal processing including:

(i) generating a plurality of phase detect signals, including first and second phase detect signals which are 90° different from each other and third and fourth phase detect signals which are different by 180°, respectively, from the first and second phase detect signals;

(ii) performing analog multiplication and integration by applying said phase detect signals to said receiving signal and providing a plurality of values of real and imaginary parts, which correspond to any one of the frequency components of said receiving signal;

(iii) converting said plurality of values into digital signals; and (iv) performing predetermined add and/or subtract operations to said plurality of values in order to eliminate offsets and/or gain variations included in said values of said real and imaginary parts;

said calculating the coordinates step including:

calculating the amplitudes and/or phase angles of any one of the frequency components of said receiving signal by using the results of said add and/or subtract operations;

wherein the plurality of values of real and imaginary parts respectively comprise:

a) values of the real part which are outputs from first and second detectors detecting the first and third signals; and b) values of the imaginary part derived from the first and second detectors processing the second and fourth signals;

wherein said predetermined add and/or subtract operations include:

(i) adding the difference of the values of the real part of first and third signal outputs of the first detector and the difference of the values of the real parts of the first and third signal outputs of the second detector, adding the difference of the values of the real part of first signal output of the first and second detectors and the difference of the values of the real part of third signal outputs of the first and second detectors, and then adding the results of the former two additions, and (ii) adding the difference of the values of the imaginary part of the second and fourth signal outputs of the first detector and the difference of said values of the imaginary part of the second and fourth signal outputs of the second detector; and (iii) adding the difference of the value of the imaginary part of second signal output by the first and second detectors and the difference of the values of the imaginary part of fourth signal outputs of the first and second detectors, then calculating the difference of the result of the former two addition.

13. A method for detecting position as claimed in claim 12, further comprising step of converting said plurality of values of real and imaginary parts into digital signals after performing the predetermined add and/or subtract operations.

14. A method of detecting position as claimed in claim 12 wherein the step for calculating said coordinate comprises:

calculating the amplitude $L_c$ by applying an approximate equation $L_c=B+A/2$, and calculating said coordinates based upon a plurality of $L_c$ values transmitted from said plurality of loop coils adjoining each other, wherein for the absolute values of said values of real and imaginary parts, the larger value, the smaller value, and an amplitude to be calculated respectively are designated A, B and $L_c$.

15. A method for detecting position as claimed in claim 12, wherein said step for calculating said coordinate comprises:

calculating the phase angle θ by applying an approximate equation $$\theta=\{1.5A/(B+0.5A)\}\times K,$$

wherein for the absolute values of said values of real and imaginary parts, A, B and θ respectively designated for the larger value, the smaller value and the phase angle to be calculated, and K is a value which expresses an angle equivalent to 45°.

16. A method for detecting position and calculating coordinate values of a position including the specified position of a position indicator based upon electromagnetic effects between a sensing unit where a large number of loop coils are disposed in parallel with respect to one another in the direction of position detection and the position indicator having at least one coil, wherein said method of detecting position comprises following steps:

calculating the coordinates of said position indicator by signal processing based upon a receiving signal transmitted from said sensing unit;

said signal processing including:

(i) generating a first pair of phase detect signals which are orthogonally related to each other and a second pair of phase detect signals each of which is in an inverted phase relationship with respect to each of the first pair;

(ii) said first pair of phase detect signals including first and second phase detect signal which are different by 90° from each other and said second pair includes third and fourth phase detect signals which are different by 180°, respectively, from the first and second phase detect signals;

(iii) switching said four signals;

(iv) performing analog multiplication and integration by applying said four signals to said receiving signal;

(v) outputting two values of real parts and two values of imaginary parts which correspond to any one frequency component of the receiving signal;

(vi) converting said two values into digital signals; and (vii) performing predetermined subtraction operations to said two values in order to eliminate the value which corresponds to offset included in said two values of real parts and said two values of imaginary parts;

said calculating step of said coordinates including:

calculating the amplitudes and/or phase angles of any one of the frequency components of said receiving signal by using the result of above subtract operations;

wherein said two real and imaginary values respectively comprise:

a) values of the real part which are outputs of the first and third signals, and b) values of the imaginary part derived from the second and fourth signals;

wherein said predetermined subtraction operations include:

calculating the difference of the values of the real part of the first and third signal outputs and calculating the difference of the values of the imaginary part of the second and fourth signal outputs.

17. A method of detecting position as claimed in claim 16, further comprising a step for converting said two respective values into digital signals after performing the predetermined subtract operations.

18. A method for detecting position and calculating coordinate values of a position including the specified position of a position indicator based upon electromagnetic effects between a sensing unit where a large number of loop coils are disposed in parallel with respect to one another in the direction of position detection and the position indicator having at least one coil, wherein said method of detecting position comprises the following steps:

calculating the coordinates of said position indicator by signal processing upon a receiving signal transmitted from said sensing unit;

said signal processing step including:

(i) generating two phase detect signals 90° different from each other;

(ii) switching said two phase detect signals;

(iii) performing analog multiplication and integration by applying said two phase detect signals to said receiving signal;

(iv) providing two respective values of real and imaginary parts which correspond to any one of frequency components of said receiving signal;

wherein said two values of real and imaginary parts respectively comprise:

a) values of the real part derived from first and second detectors detecting first signals, and b) values of the imaginary part derived from the first and second detectors processing second signals;

(v) converting said two respective values into digital signals; and (vi) performing predetermined addition to said two respective values in order to eliminate gains included in said two respective values;

said predetermined addition including:

calculating the sum of the values of the real part of first signals output by the first and second detectors and calculating the sum of the values of the imaginary part of second signals output by the first and second detectors;

wherein said calculating step of said coordinates includes:

calculating the amplitudes and/or phase angles of any one component of frequency within said receiving signal by using the result of said sum calculations.

19. A method for detecting position as claimed in claim 18, further comprising a step for converting said two respective values into digital signals after performing the predetermined addition.

20. A method for detecting position for calculating coordinate values of a position including the specified position of a position indicator based upon electromagnetic effects between a sensing unit where a large number of loop coils are disposed in parallel with respect to one another in the direction of position detection, and the position indicator having at least one coil, wherein said method for detecting position comprises the following steps:

calculating the coordinates of said position indicator by processing signals based upon a receiving signal transmitted from said sensing unit;

said signal processing step including:

(i) producing four phase detect signals including first and second phase detect signals which are different by 90° from each other and third and fourth phase detect signals which are different by 180°, respectively, from the first and second phase detect signals;

(ii) switching said phase detect signals;

(iii) performing analog multiplication and integration by applying said phase detect signals to said receiving signal, and outputting two values of the real part which corresponds to the fundamental frequency component of said receiving signal;

(iv) said two real and imaginary values respectively comprising:

values of the real part which are outputs of a first detector, detecting the first and third signals, and values of the imaginary part derived from a second detector processing the second and fourth signals;

(v) converting the values into digital signals; and (vi) performing predetermined subtract operations to said values of said real parts in order to eliminate the value which corresponds to offset included in said two values;

said predetermined subtract operations including:

calculating the difference of the values of the real part of the first and third signals and calculating the difference of the values of the imaginary part of the second and fourth signal outputs; and wherein said step for calculating said coordinates comprises:

calculating the amplitudes and/or phase angles of any one of the frequency components of said receiving signal by using the result of said subtract operations.

21. A method for detecting position as claimed in claim 20, further comprising step for converting said two values of said real parts into digital signals after performing the predetermined subtract operations.

22. A position detecting device for calculating coordinate values of a specified position of a position indicator relative to a sensing unit, the position detecting device comprising:

signal processing means including a phase detect signal generator for generating four phase detect signals including first and second phase detect signals which are different by 90° from one another and third and fourth phase detect signals which are different by 180°, respectively, from the first and second signals, wherein said first and second signals are generated by taking out from non-inverted and inverted outputs from an arithmetic processing amplifier to which a receiving signal from said sensing unit is provided;

an analog signal detect portion for performing multiplication and integration by applying said four phase detect signals to said receiving signal and outputting two values of real and imaginary parts, respectively, which correspond to the component of any one frequency of said receiving signal, said analog signal detect portion including first and second analog phase detectors each containing a multiplier and an integrator, said multipliers being analog multipliers which multiply the receiving signal with the appropriate phase detect signals;

said two real and imaginary values, respectively, including values of the real part which are outputs of the first detector detecting the first and third signals, and values of the imaginary part derived from the second detector processing the second and fourth signals;

means for performing predetermined subtraction operations to said two values of the real part or the two values of the imaginary part in order to eliminate the value which corresponds to offset included in said values, said subtraction operations including calculating the difference of the values of the real part of the first and third signal outputs by the first detector and calculating the difference of the values of the imaginary part of the second and fourth signal outputs by the first detector; and means for calculating the amplitude and/or phase angles of any one of the frequency components within the receiving signal based upon the result of said predetermined subtraction operations.

* * * * *